(12) United States Patent
Wernersson et al.

(10) Patent No.: US 12,149,308 B2
(45) Date of Patent: *Nov. 19, 2024

(54) HYBRID COMMON/INDEPENDENT FD-BASIS FOR TYPE II CSI ENHANCEMENT

(71) Applicant: TELEFONAKTIEBOLAGET LM ERICSSON (PUBL), Stockholm (SE)

(72) Inventors: Niklas Wernersson, Kungsängen (SE); Sebastian Faxér, Stockholm (SE); Maksym Girnyk, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/665,219

(22) Filed: May 15, 2024

(65) Prior Publication Data
US 2024/0313835 A1    Sep. 19, 2024

Related U.S. Application Data

(63) Continuation of application No. 18/305,743, filed on Apr. 24, 2023, now Pat. No. 12,068,816, which is a
(Continued)

(51) Int. Cl.
*H04B 7/0456* (2017.01)
*H04B 7/06* (2006.01)
*H04W 72/04* (2023.01)

(52) U.S. Cl.
CPC ......... *H04B 7/0478* (2013.01); *H04B 7/0626* (2013.01); *H04B 7/0639* (2013.01); *H04W 72/04* (2013.01)

(58) Field of Classification Search
CPC .. H04B 7/0478; H04B 7/0626; H04B 7/0639; H04B 7/10; H04W 72/04
See application file for complete search history.

(56) References Cited

U.S. PATENT DOCUMENTS 11,258,490 B2    2/2022   Wernersson
11,671,155 B2    6/2023   Wernersson
(Continued)

FOREIGN PATENT DOCUMENTS

CN    106612135 B    7/2021

OTHER PUBLICATIONS

Huawei et al. "Discussion on DSI enhancement for MU-MIMO", 3GPP TSG RAN WG1 Meeting #94bis, R1-1810103 Chengdu, China, Oct. 8-12, 2018.
(Continued)

*Primary Examiner* — Mandish K Randhawa

(57) ABSTRACT

A method performed by a wireless device for transmitting a channel state information (CSI) report for a downlink channel comprises obtaining a first set of candidate frequency-domain components and determining a set of spatial-domain components. The method comprises determining a second set of candidate frequency-domain components as a subset of the first set of candidate frequency-domain components. The method comprises determining, for each spatial-domain component of the set of spatial-domain components, a spatial-domain component-specific set of frequency-domain components as a subset of the second set of candidate frequency-domain components. The method comprises transmitting, to a network node, the CSI report.

13 Claims, 15 Drawing Sheets

Related U.S. Application Data continuation of application No. 17/574,394, filed on Jan. 12, 2022, now Pat. No. 11,671,155, which is a continuation of application No. 16/904,842, filed on Jun. 18, 2020, now Pat. No. 11,258,490, which is a continuation of application No. PCT/SE2019/051065, filed on Oct. 28, 2019.

(60) Provisional application No. 62/755,174, filed on Nov. 2, 2018.

(56) References Cited

U.S. PATENT DOCUMENTS

| | | |
|---|---|---|
| 12,068,816 B2 * | 8/2024 | Wernersson .......... H04W 72/04 |
| 2016/0301455 A1 | 10/2016 | Nammi |
| 2017/0279514 A1 | 9/2017 | Rahman et al. |
| 2017/0288751 A1 | 10/2017 | Faxér |
| 2018/0254813 A1 | 9/2018 | Gao |

OTHER PUBLICATIONS

Nokia et al. "Remaining details on CSI reporting for Type II and Type I codebook", 3GPP TSG RAN WG Meeting 90bis, R1-1718510, Prague, CZ, Oct. 9-13, 2017.

* cited by examiner

HYBRID COMMON/INDEPENDENT FD-BASIS FOR TYPE II CSI ENHANCEMENT

PRIORITY

This application is a continuation, under 35 U.S.C. § 120, of U.S. patent application Ser. No. 18/305,743 filed on Apr. 24, 2023, which is a continuation, under 35 U.S.C. § 120, of U.S. patent application Ser. No. 17/574,394 filed on Jan. 12, 2022, which is a continuation, under 35 U.S.C. § 120, of U.S. patent application Ser. No. 16/904,842 filed on Jun. 18, 2020; which is a continuation of PCT/SE2019/051065 filed Oct. 28, 2019 and entitled "HYBRID COMMON/INDEPENDENT FD-BASIS FOR TYPE II CSI ENHANCEMENT" which claims priority to U.S. Provisional Patent Application No. 62/755,174 filed Nov. 2, 2018 each of which is hereby incorporated by reference in their entirety.

TECHNICAL FIELD

The present disclosure relates, in general, to wireless communications and, more particularly, to hybrid common/independent frequency duplex-basis for Type II channel state information enhancement.

BACKGROUND

Multi-antenna techniques can significantly increase the data rates and reliability of a wireless communication system. Equipping both the transmitter and the receiver with multiple antennas results in a multiple-input multiple-output (MIMO) communication channel that improves performance. Such systems and/or related techniques are commonly referred to as MIMO.

The New Radio (NR) standard is currently evolving with enhanced MIMO support. A core component in NR is the support of MIMO antenna deployments and MIMO-related techniques, such as spatial multiplexing. The spatial-multiplexing mode aims for high data rates in favorable channel conditions.

FIG. 1 illustrates a transmission structure 100 of precoded spatial multiplexing mode in NR. In the spatial multiplexing operation depicted in FIG. 1, the information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices. The precoder matrix is typically indicated by means of a precoder matrix indicator (PMI), which specifies a unique precoder matrix in the codebook for a given number of symbol streams. The transmission rank (r) symbols in symbol vector s each correspond to a layer. In this way, spatial multiplexing is achieved since multiple symbols can be transmitted simultaneously over the same time/frequency resource element (TFRE). The number of symbols r is typically adapted to suit the current channel properties.

NR uses orthogonal frequency division multiplexing (OFDM) in the downlink (DL) and discrete Fourier transform (DFT) precoded OFDM in the uplink (UL). Hence, the received $N_R \times 1$ vector $y_n$ for a certain TFRE on subcarrier n (or alternatively data TFRE number n) is thus modeled by:

$$y_n = H_n W s_n + e_n$$

where $e_n$ is a noise/interference vector obtained as realizations of a random process. The precoder W can be a wideband precoder, which is constant over frequency, or precoder W can be frequency selective.

The precoder matrix W is often chosen to match the characteristics of the $N_R \times N_T$ MIMO channel matrix $H_n$, resulting in so-called channel dependent precoding. This is also referred to as closed-loop precoding and essentially strives to focus the transmit energy into a subspace that is strong in the sense of conveying much of the transmitted energy to the user equipment (UE).

In closed-loop precoding for the NR DL, the UE transmits recommendations to the base station (e.g., a gNodeB (gNB) in NR) of a suitable precoder to use. The UE bases these recommendations on channel measurements in the forward link (DL). In the case of NR, the gNB configures the UE to provide feedback according to CSI-ReportConfig. The gNB may transmit channel state information reference signals (CSI-RS) and may configure the UE to use measurements of CSI-RS to feed back recommended precoding matrices that the UE selects from a codebook. A single precoder that is supposed to cover a large bandwidth (wideband precoding) may be fed back. It may also be beneficial to match the frequency variations of the channel and instead feed back a frequency-selective precoding report (e.g., several precoders, one per sub-band). This is an example of the more general case of channel state information (CSI) feedback, which also encompasses feeding back other information than recommended precoders to assist the gNB in subsequent transmissions to the UE. Such other information may include channel quality indicators (CQIs) as well as transmission rank indicator (RI). In NR, CSI feedback can be either wideband, where one CSI is reported for the entire channel bandwidth, or frequency-selective, where one CSI is reported for each sub-band, which is defined as a number of contiguous resource blocks (RBs). Currently in NR, a sub-band ranges between 4 and 32 physical resource blocks (PRBs), depending on the bandwidth part (BWP) size, but more generally a sub-band can comprise any amount of PRBs.

Given the CSI feedback from the UE, the gNB determines the transmission parameters it wishes to use to transmit to the UE, including the precoding matrix, transmission rank, and modulation and coding scheme (MCS). These transmission parameters may differ from the recommendations that the UE makes. The number of columns of the precoder W reflects the transmission rank, and thus the number of spatially multiplexed layers. For efficient performance, it is important to select a transmission rank that matches the channel properties.

Two-Dimensional Antenna Arrays

Two-dimensional antenna arrays may be (partly) described by the number of antenna columns corresponding to the horizontal dimension $N_h$, the number of antenna rows corresponding to the vertical dimension $N_v$, and the number of dimensions corresponding to different polarizations $N_p$. The total number of antennas is thus $N = N_h N_v N_p$. Note that the concept of an antenna is non-limiting in the sense that it can refer to any virtualization (e.g., linear mapping) of the physical antenna elements. For example, pairs of physical sub-elements could be fed the same signal, and hence share the same virtualized antenna port.

FIG. 2 illustrates a two-dimensional antenna array of cross-polarized antenna elements. More particularly, FIG. 2 illustrates an example of a 4×4 antenna array 200 with cross-polarized antenna elements. In the example of FIG. 2, the two-dimensional antenna array of cross-polarized antenna elements ($N_p=2$) has $N_h=4$ horizontal antenna elements and $N_v=4$ vertical antenna elements.

Precoding may be interpreted as multiplying the signal with different beamforming weights for each antenna prior to transmission. One approach is to tailor the precoder to the antenna form factor (i.e., taking into account $N_h$, $N_v$ and $N_p$ when designing the precoder codebook).

Channel State Information Reference Signals (CSI-RS)

For CSI measurement and feedback, CSI-RS are defined. A CSI-RS is transmitted on each transmit antenna (or antenna port) and is used by a UE to measure the DL channel between each of the transmit antenna ports and each of its receive antenna ports. The antenna ports are also referred to as CSI-RS ports. The number of antenna ports currently supported in NR are {1, 2, 4, 8, 12, 16, 24, 32}. By measuring the received CSI-RS, a UE can estimate the channel that the CSI-RS is traversing, including the radio propagation channel and antenna gains. The CSI-RS for the above purpose is also referred to as Non-Zero Power (NZP) CSI-RS.

CSI-RS can be configured to be transmitted in certain slots and in certain resource elements (REs) in a slot.

FIG. 3 illustrates an example of RE allocation for a 12-port CSI-RS in NR 300. In the example of CSI-RS REs for 12 antenna ports illustrated in FIG. 3, one RE per RB per port is shown.

In addition, an interference measurement resource (IMR) is also defined in NR for a UE to measure interference. An IMR contains 4 REs, either 4 adjacent RE in frequency in the same OFDM symbol or 2 by 2 adjacent REs in both time and frequency in a slot. By measuring both the channel based on NZP CSI-RS and the interference based on an IMR, a UE can estimate the effective channel and noise plus interference to determine the CSI (i.e., rank, precoding matrix, and the channel quality).

Furthermore, a UE in NR may be configured to measure interference based on one or multiple NZP CSI-RS resources.

CSI Framework In NR

In NR, a UE can be configured with multiple CSI reporting settings and multiple CSI-RS resource settings. Each resource setting can contain multiple resource sets, and each resource set can contain up to 8 CSI-RS resources. For each CSI reporting setting, a UE feeds back a CSI report. Each CSI reporting setting may contain some or all of the following information: a CSI-RS resource set for channel measurement; an IMR resource set for interference measurement; a CSI-RS resource set for interference measurement; time-domain behavior (i.e., periodic, semi-persistent, or aperiodic reporting); frequency granularity (i.e., wideband or sub-band); CSI parameters to be reported such as RI, PMI, CQI, and CSI-RS resource indicator (CRI) in case of multiple CSI-RS resources in a resource set; codebook types (i.e., Type I or Type II); codebook subset restriction; measurement restriction; and sub-band size. With respect to sub-band size, one out of two possible sub-band sizes is indicated. The value range depends on the bandwidth of the BWP. One CQI/PMI (if configured for sub-band reporting) is fed back per sub-band.

When the CSI-RS resource set in a CSI reporting setting contains multiple CSI-RS resources, one of the CSI-RS resources is selected by a UE and a CSI-RS Resource Indicator (CRI) is also reported by the UE to indicate to the gNB about the selected CSI-RS resource in the resource set, together with RI, PMI and CQI associated with the selected CSI-RS resource.

For aperiodic CSI reporting in NR, more than one CSI reporting setting, each with a different CSI-RS resource set for channel measurement and/or resource set for interference measurement can be configured and triggered at the same time. In this case, multiple CSI reports are aggregated and sent from the UE to the gNB in a single Physical Uplink Shared Channel (PUSCH).

DFT-Based Precoders

One type of precoding uses a DFT-precoder, where the precoder vector used to precode a single-layer transmission using a single-polarized uniform linear array (ULA) with N antennas is defined as:

$$w_{1D}(k) = \frac{1}{\sqrt{N}} \begin{bmatrix} e^{j2\pi \cdot 0 \cdot \frac{k}{QN}} \\ e^{j2\pi \cdot 1 \cdot \frac{k}{QN}} \\ \vdots \\ e^{j2\pi \cdot (N-1) \cdot \frac{k}{QN}} \end{bmatrix},$$

where $k=0, 1, \ldots QN-1$ is the precoder index and Q is an integer oversampling factor. A corresponding precoder vector for a two-dimensional uniform planar array (UPA) can be created by taking the Kronecker product of two precoder vectors as:

$$w_{2D}(k, l) = w_{1D}(k) \otimes w_{1D}(l).$$

Extending the precoder for a dual-polarized UPA may then be done as:

$$w_{2D,DP}(k, l, \phi) = \begin{bmatrix} 1 \\ e^{j\phi} \end{bmatrix} \otimes w_{2D}(k, l) = \begin{bmatrix} w_{2D}(k, l) \\ e^{j\phi} w_{2D}(k, l) \end{bmatrix} = \begin{bmatrix} w_{2D}(k, l) & 0 \\ 0 & w_{2D}(k, l) \end{bmatrix} \begin{bmatrix} 1 \\ w_{2D}(k, l) \end{bmatrix} \begin{bmatrix} 1 \\ e^{j\phi} \end{bmatrix},$$

where $e^{j\phi}$ is a co-phasing factor that may, for instance, be selected from Quadrature Phase Shift Keying (QPSK) alphabet $\phi \in \{0, \pi/2, \pi, 3\pi/2\}$.

A precoder matrix $W_{2D,DP}$ for multi-layer transmission may be created by appending columns of DFT precoder vectors as:

$$W_{2D,DP} = [w_{2D,DP}(k_1, l_1, \phi_1) \ w_{2D,DP}(k_2, l_2, \phi_2) \ \ldots \ w_{2D,DP}(k_R, l_R, \phi_R)],$$

where R is the number of transmission layers (i.e., the transmission rank). In a special case for a rank-2 DFT precoder, $k_1=k_2=k$ and $l_1=l_2=l$, meaning that:

$$W_{2D,DP} = [w_{2D,DP}(k, l, \phi_1) \ w_{2D,DP}(k, l, \phi_2)] = \begin{bmatrix} w_{2D}(k, l) & 0 \\ 0 & w_{2D}(k, l) \end{bmatrix} \begin{bmatrix} 1 & 1 \\ e^{j\phi_1} & e^{j\phi_2} \end{bmatrix}.$$

Such DFT-based precoders are used, for example, in NR Type I CSI feedback.

Multi-User MIMO (MU-MIMO)

With MU-MIMO, two or more users in the same cell are co-scheduled on the same time-frequency resource. That is, two or more independent data streams are transmitted to different UEs at the same time, and the spatial domain is used to separate the respective streams. By transmitting several streams simultaneously, the capacity of the system can be increased. This, however, comes at the cost of reducing the signal-to-interference-plus-noise ratio (SINR) per stream, as the power must be shared between streams and the streams will cause interference to each-other.

Multi-Beam (Linear Combination) Precoders

One central part of MU-MIMO is obtaining accurate CSI that enables nullforming between co-scheduled users. Therefore, support has been added in Long Term Evolution (LTE) Release 14 (Rel-14) and NR Release 15 (Rel-15) for codebooks that provide more detailed CSI than the traditional single DFT-beam precoders. These codebooks are referred to as Advanced CSI (in LTE) or Type II codebooks (in NR) and can be described as a set of precoders where each precoder is created from multiple DFT beams. A multi-beam precoder may be defined as a linear combination of several DFT precoder vectors as:

$$w = \sum_i c_i \cdot w_{2D,DP}(k_i, l_i, \phi_i),$$

where $\{c_i\}$ may be general complex coefficients. Such a multi-beam precoder may more accurately describe the UE's channel and may thus bring an additional performance benefit compared to a DFT precoder, especially for MU-MIMO where rich channel knowledge is desirable in order to perform nullforming between co-scheduled UEs.

NR Rel-15

For the NR Type II codebook in Rel-15, the precoding vector for each layer and sub-band is expressed in $3^{rd}$ Generation Partnership Project (3GPP) TS 38.214 v15.3.0 as:

$$W^l_{q_1,q_2,n_1,n_2,p_l^{(1)},p_l^{(2)},c_l} = \frac{1}{\sqrt{N_1 N_2 \sum_{i=0}^{2L-1} (p_{l,i}^{(1)} p_{l,i}^{(2)})^2}}$$

$$\begin{bmatrix} \sum_{i=0}^{L-1} v_{m_1^{(i)},m_2^{(i)}} p_{l,i}^{(1)} p_{l,i}^{(2)} \varphi_{l,i} \\ \sum_{i=0}^{L-1} v_{m_1^{(i)},m_2^{(i)}} p_{l,i+L}^{(1)} p_{l,i+L}^{(2)} \varphi_{l,i+L} \end{bmatrix}, l = 1, 2$$

By restructuring the above formula and expressing it more simply, the precoder vector $w_{l,p}(k)$ can be formed for a certain layer l=0, 1, polarization p=0, 1 and resource block k=0, ..., $N_{RB}-1$, as:

$$w_{l,p}(k) = \frac{1}{C} \sum_{i=0}^{L-1} v_i p_{l,i}^{(1)} c_{l,i}(k) \text{ where } c_{l,i}(k) = p_{l,i}^{(2)}\left(\left\lfloor\frac{k}{s}\right\rfloor\right)\varphi_{l,i}\left(\left\lfloor\frac{k}{s}\right\rfloor\right)$$

for p=0 and $$c_{l,i}(k) = p_{l,L+i}^{(2)}\left(\left\lfloor\frac{k}{s}\right\rfloor\right)\varphi_{l,L+i}\left(\left\lfloor\frac{k}{s}\right\rfloor\right)$$

for p=1, S is the sub-band size and $N_{SB}$ is the number of sub-bands in the CSI reporting bandwidth. Hence, the change in a beam coefficient across frequency $c_{l,i}(k)$ is determined based on the $2N_{SB}$ parameters $p_{l,i}^{(2)}(0)$, ..., $p_{l,i}^{(2)}(N_{SB}-1)$ and $\varphi_{l,i}(0)$, ..., $\varphi_{l,i}(N_{SB}-1)$, where the sub-band amplitude parameter $\varphi_{l,i}^{(2)}$ is quantized using 0-1 bit and the sub-band phase parameter $\varphi_{l,i}$ is quantized using 2-3 bits, depending on codebook configuration.

Type II Overhead Reduction for NR Release 16 (Rel-16)

The Type II CSI feedback performance and overhead is sensitive to the sub-band size. The optimal Type II CSI beam coefficients can vary quite rapidly over frequency, and hence the more averaging that is performed (i.e., the larger the sub-band size), the more reduction in MU-MIMO performance can be expected. Operation with Type II CSI is typically compared against reciprocity-based operation, where subcarrier-level CSI can be obtained via SRS sounding. In the NR CSI reporting procedure, there are two possible CSI sub-band sizes defined for sub-band based CSI reporting for each number of PRBs of the BWP (i.e. the BWP bandwidth) and the gNB configures which of the two sub-band sizes to use as part of the CSI reporting configuration. For 10 MHz bandwidth using 15 kHz subcarrier spacing (SCS), which is a typical LTE configuration, NR features either seven 1.44 MHz sub-bands or thirteen 720 kHz sub-bands. However, for 100 MHz bandwidth using 30 kHz SCS, a typical NR configuration, NR features either nine 11.52 MHz sub-bands or eighteen 5.76 MHz sub-bands. Such large sub-band sizes could result in poor CSI quality.

Overhead reductions are considered for NR Rel-16 Type II. The rationale is that it has been observed that there is a strong correlation between different values of $c_{l,i}(k)$, for different values of k, and this correlation could be exploited to perform efficient compression of the information in order to reduce the number of bits required to represent the information. This would lower the amount of information that needs to be signaled from the UE to the gNB, which is relevant from several aspects. Both lossy (implying a potentially decreased level of quality in the CSI) as well as lossless compression may be considered.

In the case of lossy compression, there are many ways to parametrize the beam coefficients over frequency to achieve an appropriate CSI quality vs. overhead trade-off. By keeping the basic structure of the precoder as described above, one may update the expression for $c_{l,i}(k)$. More generally, one can describe $c_{l,i}(k)$ as a function $f(k, \alpha_0, \ldots, \alpha_{M-1})$ that is based on the M parameters $\alpha_0, \ldots, \alpha_{M-1}$, where these M parameters in turn are represented using a number of bits that can be fed back as part of the CSI report.

As an example, consider the special case where $f(k, \alpha_0, \ldots, \alpha_{M-1})$ constitutes a linear transformation. In this case, the function can be expressed by using a transformation matrix:

$$B = \begin{bmatrix} b_{0,0} & \cdots & b_{0,K} \\ \vdots & \ddots & \vdots \\ b_{N_{RB},0} & \cdots & b_{N_{RB},K} \end{bmatrix} = [b_0 \ldots b_K],$$

consisting of K number of $N_{RB} \times 1$ sized basis vectors along with a coefficient vector:

$$a = \begin{bmatrix} a_0 \\ \ldots \\ a_{K-1} \end{bmatrix}$$

Here, $N_{RB}$ is the number of RBs in the CSI reporting bandwidth. Other granularities and units of the basis vectors can also be considered, such as the number of sub-bands $N_{SB}$, a subcarrier level granularity with $12N_{RB} \times 1$ size basis vectors, or a number of RBs.

For instance, the M parameters can be split up into a parameter I, selecting the K basis vectors from a set of basis vector candidates, and the coefficients $a_0, \ldots, a_{K-1}$. That is, some index parameter I determines the basis matrix B, for instance, by selecting columns from a wider matrix or by some other way. The beam coefficients may then be expressed as:

$$c_{l,i}(f) = f(k, I, a_0, \ldots, a_{K-1}) = [B]_{k,:} a = \sum_{d=0}^{K-1} b_{k,d} a_d.$$

That is, by forming a vector with all the beam coefficients (for a beam) such as:

$$c_{l,i} = \begin{bmatrix} c_{l,i}(0) \\ \ldots \\ c_{l,i}(N_{RB}-1) \end{bmatrix},$$

that vector can be expressed as a linear transformation:

$$c_{l,i} = Ba_i.$$

In fact, the entire precoder can be expressed using matrix formulation, which is good for illustrative purposes. The beam coefficients for all the beams i and resource blocks k can be stacked into a matrix:

$$C_F = \begin{bmatrix} c_{l,0}^T \\ \ldots \\ c_{l,2L-1}^T \end{bmatrix},$$

(where L is the number of beams) which then can be expressed as:

$$C_F = \begin{bmatrix} c_{l,0}^T \\ \ldots \\ c_{l,2L-1}^T \end{bmatrix} = \begin{bmatrix} a_0^T B^T \\ \ldots \\ a_{2L-1}^T B^T \end{bmatrix} = \begin{bmatrix} a_0^T \\ \ldots \\ a_{2L-1}^T \end{bmatrix} B^T = \tilde{C}_F B^T.$$

The linear combination of beam basis vectors and beam coefficients can also be expressed as a matrix product. This implies that the precoders (for all RBs) for a certain layer can be expressed as a matrix product:

$$W_F = W_1 C_F = W_1 \tilde{C}_F B^T.$$

That is, a spatial linear transformation (from antenna domain to beam domain) is applied from the left by multiplication of $W_1$ and from the right a frequency linear transformation by multiplication of $B^T$. The precoders are then expressed more sparsely using a smaller coefficient matrix $\tilde{C}_F$ in this transformed domain.

FIG. 4 illustrates a matrix representation 400 of the Type II overhead reduction scheme described above, where examples of the dimensions of the matrix components of the precoder are illustrated.

There currently exist certain challenges. For example, Type II precoder schemes may lead to better MU-MIMO performance, but at the cost of increased CSI feedback overhead and UE precoder search complexity. It is an open problem of how an efficient Type II codebook that results in good MU-MIMO performance, but low feedback overhead, should be constructed as well as how the CSI feedback should be derived by the UE. As another example, it is an open issue how to support higher rank representations for Type II feedback. One problem is that the feedback overhead increases with the number of layers, which makes a high layer representation infeasible.

SUMMARY

To address the foregoing problems with existing approaches, disclosed is a method performed by a wireless device for transmitting a CSI report for a downlink channel, the CSI report indicating a plurality of precoder vectors, wherein each of the precoder vectors corresponds to a frequency sub-band of the bandwidth of the downlink channel, a precoder vector being expressed as a linear combination of spatial-domain components and frequency-domain components, and wherein indicating the plurality of precoder vectors comprises indicating the frequency-domain components and a set of linear combination coefficients. The method comprises obtaining a first set of candidate frequency-domain components. The method comprises determining a set of spatial-domain components. The method comprises determining a second set of candidate frequency-domain components as a subset of the first set of candidate frequency-domain components. The method comprises determining, for each spatial-domain component of the set of spatial-domain components, a spatial-domain component-specific set of frequency-domain components as a subset of the second set of candidate frequency-domain components, wherein each frequency-domain component in the spatial-domain component-specific set of frequency-domain components is associated with a non-zero coefficient of the set of linear combination coefficients. The method comprises transmitting, to a network node, the CSI report comprising an indication of: the determined second set of candidate frequency-domain components; the determined spatial-domain component-specific sets of frequency-domain components; and the non-zero coefficients of the set of linear combination coefficients.

In certain embodiments, determining the second set of candidate frequency-domain components as a subset of the first set of candidate frequency-domain components may comprise: analyzing an estimate of the downlink channel to determine one or more properties of the downlink channel; and selecting the second set of candidate frequency-domain components from the first set of candidate frequency-domain components based on the determined one or more properties of the downlink channel.

In certain embodiments, the candidate frequency-domain components may be orthogonal basis vectors. In certain embodiments, the orthogonal basis vectors may be discrete Fourier transform vectors.

In certain embodiments, a size of the frequency sub-band may be an integer number of PRBs.

In certain embodiments, determining the spatial-domain component-specific set of frequency-domain components may comprise determining if the associated one or more linear combining coefficients are non-zero.

In certain embodiments, obtaining the first set of candidate frequency-domain components may comprise defining a first basis constituting a number of basis vectors.

In certain embodiments, obtaining the first set of candidate frequency-domain components may comprise one of: obtaining the first set of candidate frequency-domain components by accessing a predefined table; obtaining the first set of candidate frequency-domain components via higher layer signaling; and determining the first set of candidate frequency-domain components.

In certain embodiments, determining the second set of candidate frequency-domain components as a subset of the first set of candidate frequency-domain components may comprise creating a common basis for all spatial-domain components.

In certain embodiments, the first set of candidate frequency-domain components may be a first basis matrix B comprising K basis vectors. In certain embodiments, determining the second set of candidate frequency-domain components as the subset of the first set of candidate frequency-domain components may comprise selecting $K_c < K$ columns of the first basis matrix B and concatenating the selected columns $K_c$ to form a common basis matrix $B_c$. In certain embodiments, the common basis matrix $B_c$ may be chosen per one or more of polarization and layer.

In certain embodiments, determining the spatial-domain component-specific frequency-domain components may comprise selecting a selection of columns from the common basis matrix $B_C$.

Also disclosed is a computer program, the computer program comprising instructions configured to perform the above-described method in a wireless device.

Also disclosed is a computer program product, the computer program product comprising a non-transitory computer-readable storage medium, the non-transitory computer-readable storage medium comprising a computer program comprising computer-executable instructions which, when executed on a processor, are configured to perform the above-described method in a wireless device.

Also disclosed is a wireless device configured to transmit a CSI report for a downlink channel, the CSI report indicating a plurality of precoder vectors, wherein each of the precoder vectors corresponds to a frequency sub-band of the bandwidth of the downlink channel, a precoder vector being expressed as a linear combination of spatial-domain components and frequency-domain components, and wherein indicating the plurality of precoder vectors comprises indicating the frequency-domain components and a set of linear combination coefficients. The wireless device comprises: a receiver; a transmitter; and processing circuitry coupled to the receiver and the transmitter. The processing circuitry is configured to obtain a first set of candidate frequency-domain components. The processing circuitry is configured to determine a set of spatial-domain components. The processing circuitry is configured to determine a second set of candidate frequency-domain components as a subset of the first set of candidate frequency-domain components. The processing circuitry is configured to determine, for each spatial-domain component of the set of spatial-domain components, a spatial-domain component-specific set of frequency-domain components as a subset of the second set of candidate frequency-domain components, wherein each frequency-domain component in the spatial-domain component-specific set of frequency-domain components is associated with a non-zero coefficient of the set of linear combination coefficients. The processing circuitry is configured to transmit, to a network node, the CSI report comprising an indication of: the determined second set of candidate frequency-domain components; the determined spatial-domain component-specific sets of frequency-domain components; and the non-zero coefficients of the set of linear combination coefficients.

In certain embodiments, the processing circuitry configured to determine the second set of candidate frequency-domain components as a subset of the first set of candidate frequency-domain components may be further configured to: analyze an estimate of the downlink channel to determine one or more properties of the downlink channel; and select the second set of candidate frequency-domain components from the first set of candidate frequency-domain components based on the determined one or more properties of the downlink channel.

In certain embodiments, the candidate frequency-domain components may be orthogonal basis vectors. In certain embodiments, the orthogonal basis vectors may be discrete Fourier transform vectors.

In certain embodiments, a size of the frequency sub-band may be an integer number of PRBs.

In certain embodiments, the processing circuitry configured to determine the spatial-domain component-specific set of frequency-domain components may be further configured to: determine if the associated one or more linear combining coefficients are non-zero.

In certain embodiments, the processing circuitry configured to obtain the first set of candidate frequency-domain components may be further configured to define a first basis constituting a number of basis vectors.

In certain embodiments, the processing circuitry configured to obtain the first set of candidate frequency-domain components may be further configured to: obtain the first set of candidate frequency-domain components by accessing a predefined table; obtain the first set of candidate frequency-domain components via higher layer signaling; and determine the first set of candidate frequency-domain components.

In certain embodiments, the processing circuitry configured to determine the second set of candidate frequency-domain components as a subset of the first set of candidate frequency-domain components may be further configured to create a common basis for all spatial-domain components.

In certain embodiments, the first set of candidate frequency-domain components may be a first basis matrix B comprising K basis vectors. In certain embodiments, the processing circuitry configured to determine the second set of candidate frequency-domain components as the subset of the first set of candidate frequency-domain components may be further configured to select $K_c < K$ columns of the first basis matrix B and concatenate the selected columns $K_c$ to form a common basis matrix $B_c$. In certain embodiments, the common basis matrix $B_c$ may be chosen per one or more of polarization and layer.

In certain embodiments, the processing circuitry configured to determine the spatial-domain component-specific frequency-domain components may be further configured to: select a selection of columns from the common basis matrix $B_C$.

Also disclosed is a method performed by a network node for receiving a CSI report for a downlink channel, the CSI report indicating a plurality of precoder vectors, wherein each of the precoder vectors corresponds to a frequency sub-band of the bandwidth of the downlink channel, a precoder vector being expressed as a linear combination of spatial-domain components and frequency-domain components, and wherein indicating the plurality of precoder vectors comprises indicating the frequency-domain components and a set of linear combination coefficients. The method comprises receiving, from a wireless device, the CSI report comprising an indication of: a second set of candidate frequency-domain components being a subset of a first set of candidate frequency-domain components; one or more spatial-domain component-specific sets of frequency-domain components being subsets of the second set of candidate frequency-domain components, each frequency-domain component in the one or more spatial-domain component-specific sets of frequency-domain components being associated with non-zero coefficients of the set of linear combination coefficients; and the non-zero coefficients. The method comprises determining one or more precoder vectors based upon the indication received in the CSI report.

In certain embodiments, the method may further comprise using one of the determined one or more precoder vectors to perform a transmission to the wireless device.

In certain embodiments, the method may further comprise using a different precoder vector from the one or more determined precoder vectors to perform a transmission to the wireless device.

In certain embodiments, a size of the frequency sub-band may be an integer number of PRBs.

Also disclosed is a computer program, the computer program comprising instructions configured to perform the above-described method in a network node.

Also disclosed is a computer program product, the computer program product comprising a non-transitory computer-readable storage medium, the non-transitory computer-readable storage medium comprising a computer program comprising computer-executable instructions which, when executed on a processor, are configured to perform the above-described method in a network node.

Also disclosed is a network node configured to receive a CSI report for a downlink channel, the CSI report indicating a plurality of precoder vectors, wherein each of the precoder vectors corresponds to a frequency sub-band of the bandwidth of the downlink channel, a precoder vector being expressed as a linear combination of spatial-domain components and frequency-domain components, and wherein indicating the plurality of precoder vectors comprises indicating the frequency-domain components and a set of linear combination coefficients. The network node comprises: a receiver; a transmitter; and processing circuitry coupled to the receiver and the transmitter. The processing circuitry is configured to receive, from a wireless device, the CSI report comprising an indication of: a second set of candidate frequency-domain components being a subset of a first set of candidate frequency-domain components; one or more spatial-domain component-specific sets of frequency-domain components being subsets of the second set of candidate frequency-domain components, each frequency-domain component in the one or more spatial-domain component-specific sets of frequency-domain components being associated with non-zero coefficients of the set of linear combination coefficients; and the non-zero coefficients. The processing circuitry is configured to determine one or more precoder vectors based upon the indication received in the CSI report.

In certain embodiments, the processing circuitry may be further configured to use one of the determined one or more precoder vectors to perform a transmission to the wireless device.

In certain embodiments, the processing circuitry may be further configured to use a different precoder vector from the one or more determined precoder vectors to perform a transmission to the wireless device.

In certain embodiments, a size of the frequency sub-band may be an integer number of PRBs.

Certain embodiments of the present disclosure may provide one or more technical advantages. As one example, certain embodiments may advantageously increase MU-MIMO performance by having rich precoder feedback with reasonable feedback overhead. As another example, in certain embodiments the performance/overhead trade-off can be further optimized by allowing the frequency-domain basis vectors for each beam to be independently selected from a smaller subset of common basis beam, which advantageously reduces their index space. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
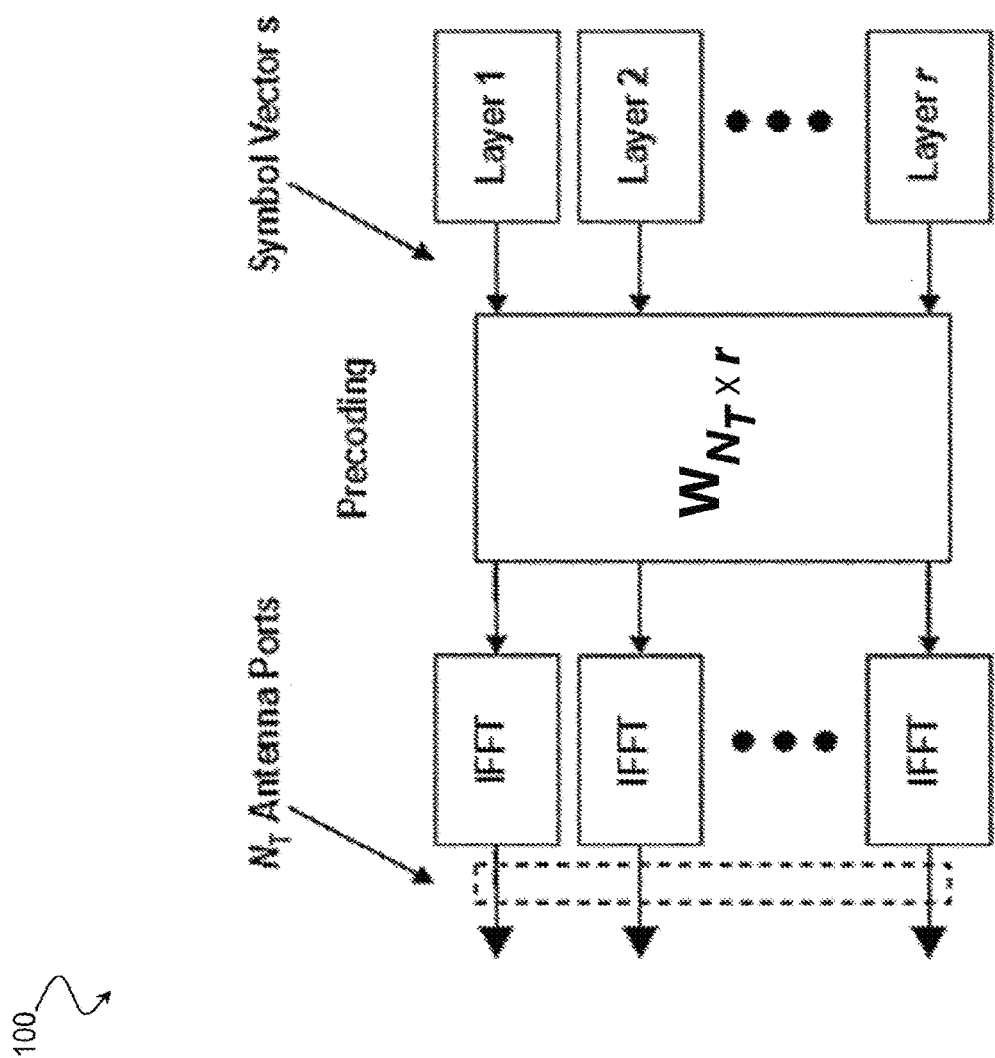
FIG. 1 illustrates a transmission structure of precoded spatial multiplexing mode in NR, in accordance with certain embodiments.
Figure 2:
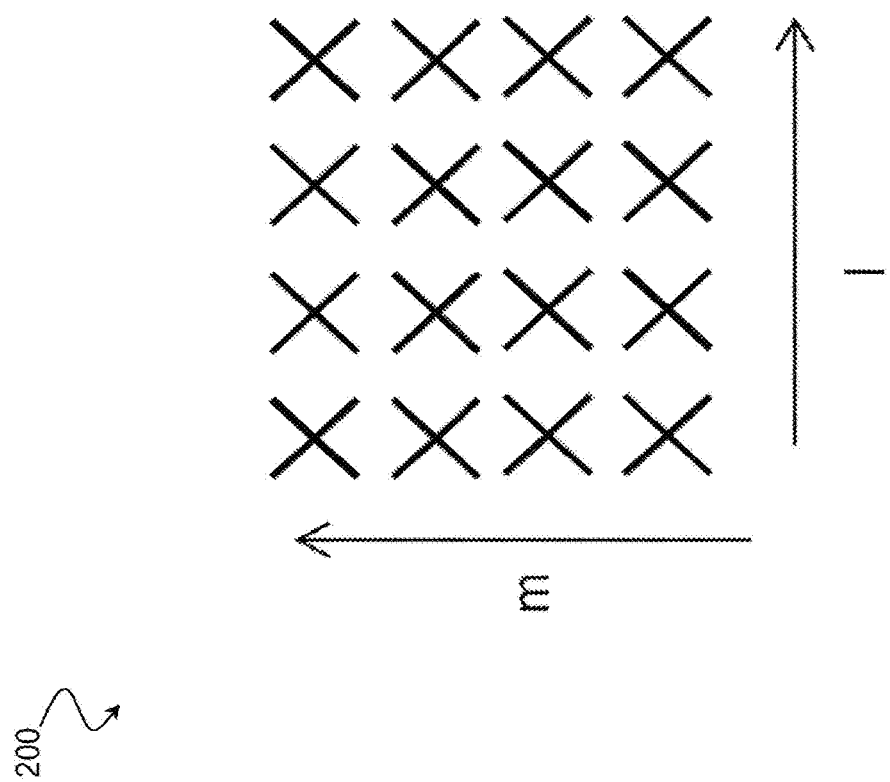
FIG. 2 illustrates a two-dimensional antenna array of cross-polarized antenna elements, in accordance with certain embodiments.
Figure 3:
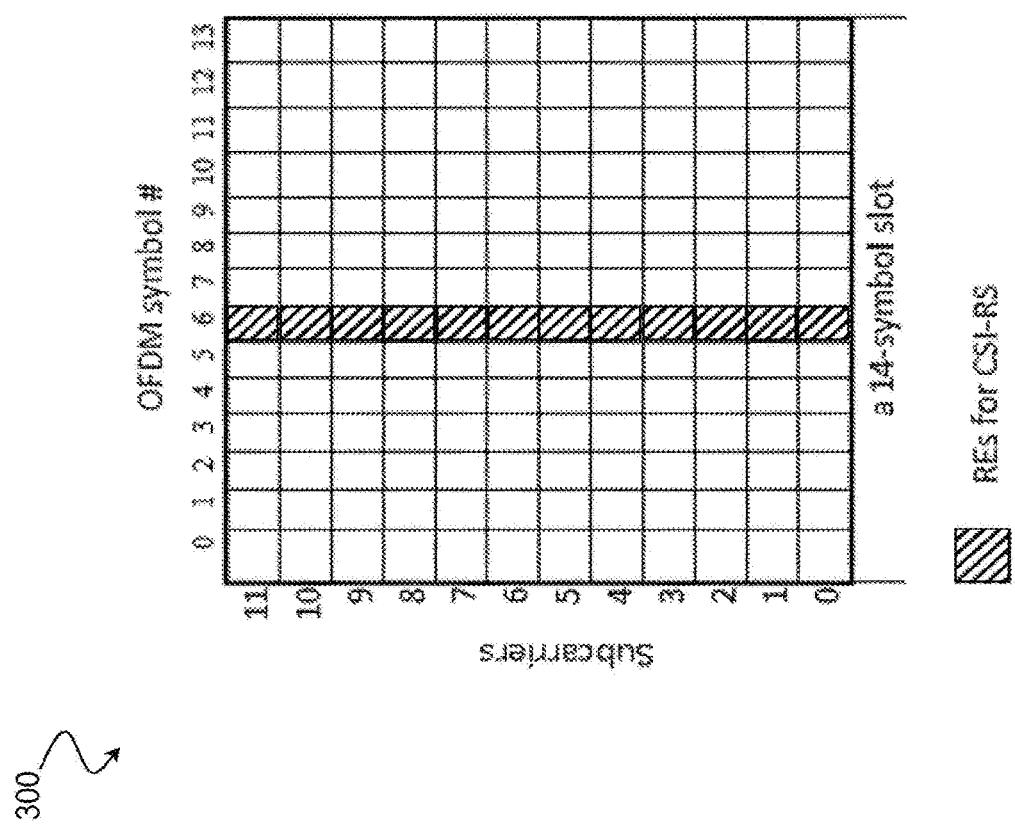
FIG. 3 illustrates an example of resource element allocation for a 12-port CSI-RS in NR, in accordance with certain embodiments.
Figure 4:
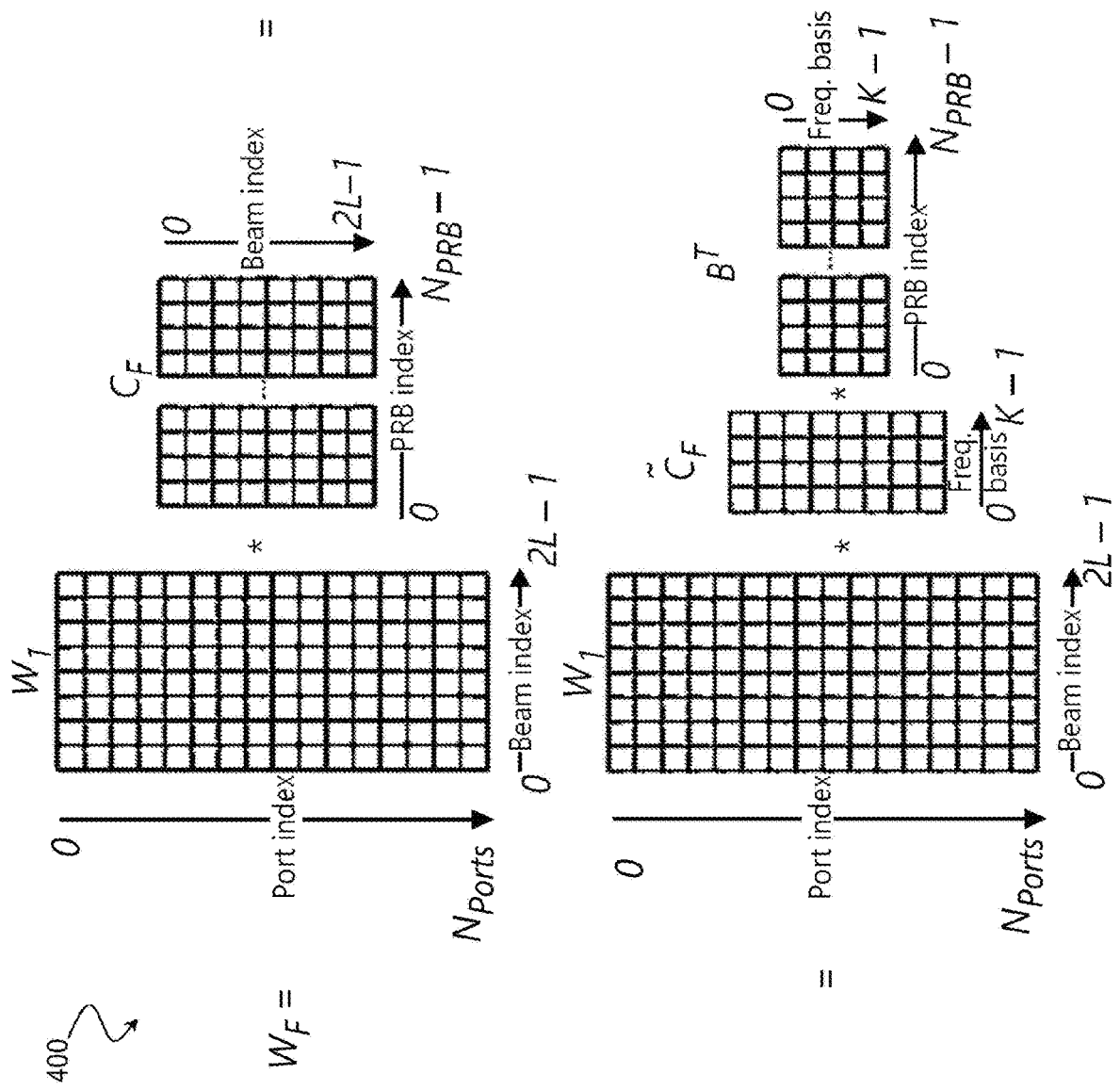
FIG. 4 illustrates a matrix representation of the Type II overhead reduction scheme, in accordance with certain embodiments.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As described above, with MU-MIMO, two or more users in the same cell can be co-scheduled on the same time-frequency resource. Because one central part of MU-MIMO is obtaining accurate CSI that enables nullforming between co-scheduled users, support has been added in LTE Rel-14 and NR Rel-15 for codebooks that provide more detailed CSI than the traditional single DFT-beam precoders. These codebooks are referred to as Advanced CSI (in LTE) or Type II codebooks (in NR). Although Type II precoder schemes may lead to better MU-MIMO performance, Type II precoder schemes are problematic due to increased CSI feedback overhead and UE precoder search complexity. Thus, there is a need for an efficient Type II codebook that results in good MU-MIMO performance and low feedback overhead as well as an improved method for deriving the CSI feedback by the UE. Moreover, there is a need to support higher rank representations for Type II feedback. This is problematic, as feedback overhead increases with the number of layers, which makes a high layer representation infeasible.

Certain aspects of the present disclosure and the embodiments described herein may provide solutions to these or other challenges. According to one example embodiment, a method performed by a wireless device for transmitting a CSI report for a DL channel is disclosed. The CSI report indicates a plurality of precoder vectors. Each of the precoder vectors corresponds to a frequency sub-band of the bandwidth of the DL channel. A precoder vector may be expressed as a linear combination of spatial-domain components and frequency-domain components. Indicating the plurality of precoder vectors may comprise indicating the frequency-domain components and a set of linear combination coefficients.

In this example embodiment, the wireless device (e.g., a UE) obtains a first set of candidate frequency-domain components and determines a set of spatial-domain components. The wireless device determines a second set of candidate frequency-domain components as a subset of the first set of candidate frequency-domain components. The wireless device determines, for each spatial-domain component of the set of spatial-domain components, a spatial-domain component-specific set of frequency-domain components as a subset of the second set of candidate frequency-domain components. Each frequency-domain component in the spatial-domain component-specific set of frequency-domain components may be associated with a non-zero coefficient of the set of linear combination coefficients. The wireless device transmits, to a network node (e.g., a gNB), the CSI report comprising an indication of: the determined second set of candidate frequency-domain components; the determined spatial-domain component-specific sets of frequency-domain components; and the non-zero coefficients of the set of linear combination coefficients.

According to other example embodiments, a corresponding wireless device, computer program, and computer program product are also disclosed.

According to another example embodiment, a method performed by a network node for receiving a CSI report for a DL channel is disclosed. The CSI report indicates a plurality of precoder vectors. Each of the precoder vectors corresponds to a frequency sub-band of the bandwidth of the DL channel. A precoder vector may be expressed as a linear combination of spatial-domain components and frequency-domain components, and the plurality of precoder vectors may be indicated by indicating the frequency-domain components and a set of linear combination coefficients.

The network node receives, from a wireless device, the CSI report comprising an indication of: a second set of candidate frequency-domain components being a subset of a first set of candidate frequency-domain components; one or more spatial-domain component-specific sets of frequency-domain components being subsets of the second set of candidate frequency-domain components, each frequency-domain component in the one or more spatial-domain component-specific sets of frequency-domain components being associated with non-zero coefficients of the set of linear combination coefficients; and the non-zero coefficients. The network node determines one or more precoder vectors based upon the indication received in the CSI report.

According to other example embodiments, a corresponding network node, computer program, and computer program product are also disclosed.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 5:
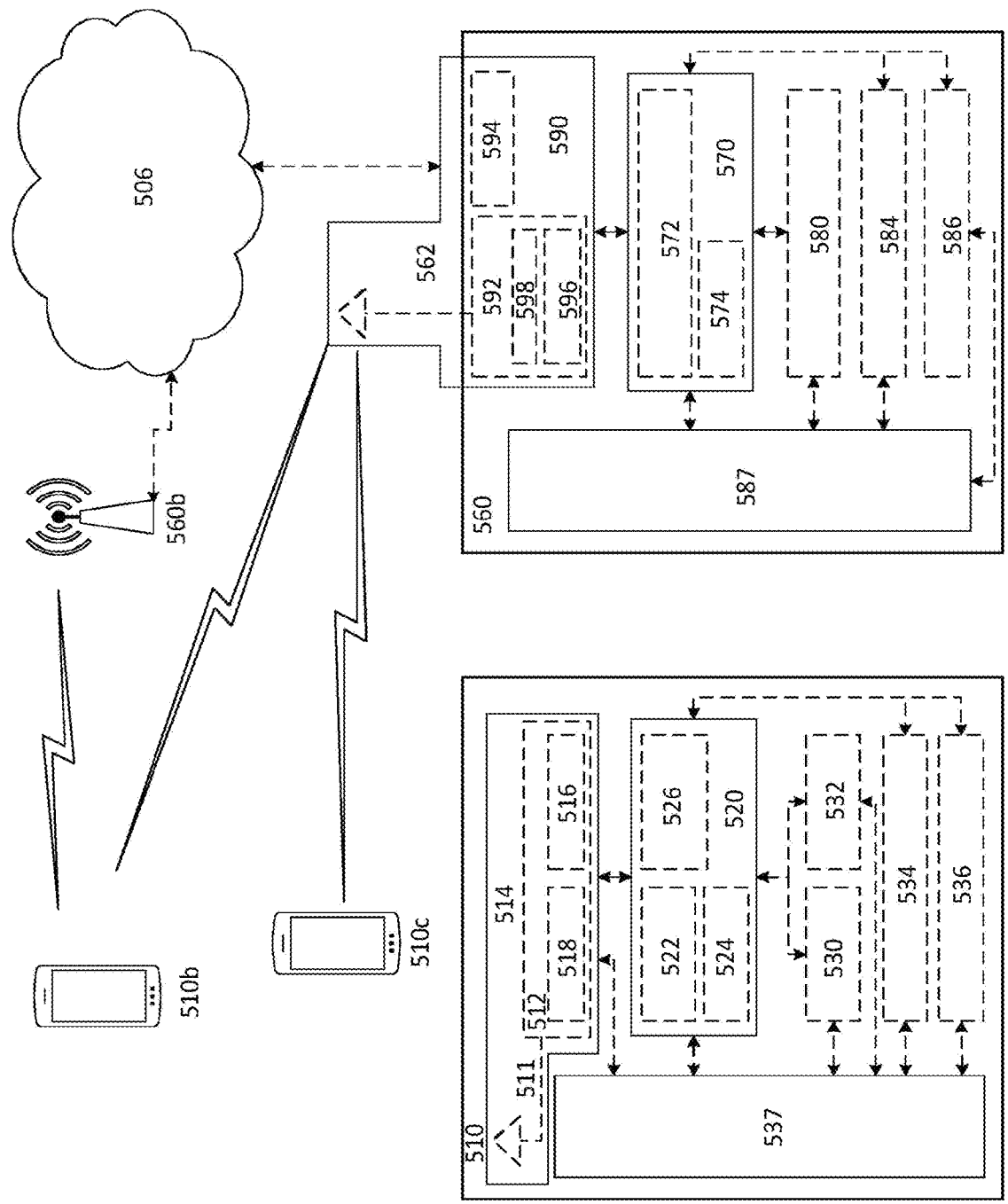
FIG. 5 illustrates an example wireless network, in accordance with certain embodiments.

FIG. 5 illustrates a wireless network in accordance with some embodiments. Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 506, network nodes 560 and 560b, and wireless devices 510, 510b, and 510c. In practice, a wireless network may further include any additional elements suitable to support communication between wireless devices or between a wireless device and another communication device, such as a landline telephone, a service provider, or any other network node or end device. Of the illustrated components, network node 560 and wireless device 510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 560 and wireless device 510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 560 includes processing circuitry 570, device readable medium 580, interface 590, auxiliary equipment 584, power source 586, power circuitry 587, and antenna 562. Although network node 560 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 560 are depicted as single boxes located within a larger box, or nested within multiple boxes, in practice, a network node may comprise multiple different physical components that make up a single illustrated component (e.g., device readable medium 580 may comprise multiple separate hard drives as well as multiple RAM modules).

Similarly, network node 560 may be composed of multiple physically separate components (e.g., a NodeB component and a RNC component, or a BTS component and a BSC component, etc.), which may each have their own respective components. In certain scenarios in which network node 560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 560 may be configured to support multiple radio access technologies (RATs). In such embodiments, some components may be duplicated (e.g., separate device readable medium 580 for the different RATs) and some components may be reused (e.g., the same antenna 562 may be shared by the RATs). Network node 560 may also include multiple sets of the various illustrated components for different wireless technologies integrated into network node 560, such as, for example, GSM, WCDMA, LTE, NR, WiFi, or Bluetooth wireless technologies. These wireless technologies may be integrated into the same or different chip or set of chips and other components within network node 560.

Processing circuitry 570 is configured to perform any determining, calculating, or similar operations (e.g., certain obtaining operations) described herein as being provided by a network node. These operations performed by processing circuitry 570 may include processing information obtained by processing circuitry 570 by, for example, converting the obtained information into other information, comparing the obtained information or converted information to information stored in the network node, and/or performing one or more operations based on the obtained information or converted information, and as a result of said processing making a determination.

Processing circuitry 570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 560 components, such as device readable medium 580, network node 560 functionality. For example, processing circuitry 570 may execute instructions stored in device readable medium 580 or in memory within processing circuitry 570. Such functionality may include providing any of the various wireless features, functions, or benefits discussed herein. In some embodiments, processing circuitry 570 may include a system on a chip (SOC).

In some embodiments, processing circuitry 570 may include one or more of radio frequency (RF) transceiver circuitry 572 and baseband processing circuitry 574. In some embodiments, radio frequency (RF) transceiver circuitry 572 and baseband processing circuitry 574 may be on separate chips (or sets of chips), boards, or units, such as radio units and digital units. In alternative embodiments, part or all of RF transceiver circuitry 572 and baseband processing circuitry 574 may be on the same chip or set of chips, boards, or units In certain embodiments, some or all of the functionality described herein as being provided by a network node, base station, eNB or other such network device may be performed by processing circuitry 570 executing instructions stored on device readable medium 580 or memory within processing circuitry 570. In alternative embodiments, some or all of the functionality may be provided by processing circuitry 570 without executing instructions stored on a separate or discrete device readable medium, such as in a hard-wired manner. In any of those embodiments, whether executing instructions stored on a device readable storage medium or not, processing circuitry 570 can be configured to perform the described functionality. The benefits provided by such functionality are not limited to processing circuitry 570 alone or to other components of network node 560, but are enjoyed by network node 560 as a whole, and/or by end users and the wireless network generally.

Device readable medium 580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 570. Device readable medium 580 may store any suitable instructions, data or information, including a computer program, software, an application including one or more of logic, rules, code, tables, etc. and/or other instructions capable of being executed by processing circuitry 570 and, utilized by network node 560. Device readable medium 580 may be used to store any calculations made by processing circuitry 570 and/or any data received via interface 590. In some embodiments, processing circuitry 570 and device readable medium 580 may be considered to be integrated.

Interface 590 is used in the wired or wireless communication of signalling and/or data between network node 560, network 506, and/or wireless devices 510. As illustrated, interface 590 comprises port(s)/terminal(s) 594 to send and receive data, for example to and from network 506 over a wired connection. Interface 590 also includes radio front end circuitry 592 that may be coupled to, or in certain embodiments a part of, antenna 562. Radio front end circuitry 592 comprises filters 598 and amplifiers 596. Radio front end circuitry 592 may be connected to antenna 562 and processing circuitry 570. Radio front end circuitry may be configured to condition signals communicated between antenna 562 and processing circuitry 570. Radio front end circuitry 592 may receive digital data that is to be sent out to other network nodes or wireless devices via a wireless connection. Radio front end circuitry 592 may convert the digital data into a radio signal having the appropriate channel and bandwidth parameters using a combination of filters 598 and/or amplifiers 596. The radio signal may then be transmitted via antenna 562. Similarly, when receiving data, antenna 562 may collect radio signals which are then converted into digital data by radio front end circuitry 592. The digital data may be passed to processing circuitry 570. In other embodiments, the interface may comprise different components and/or different combinations of components.

In certain alternative embodiments, network node 560 may not include separate radio front end circuitry 592, instead, processing circuitry 570 may comprise radio front end circuitry and may be connected to antenna 562 without separate radio front end circuitry 592. Similarly, in some embodiments, all or some of RF transceiver circuitry 572 may be considered a part of interface 590. In still other embodiments, interface 590 may include one or more ports or terminals 594, radio front end circuitry 592, and RF transceiver circuitry 572, as part of a radio unit (not shown), and interface 590 may communicate with baseband processing circuitry 574, which is part of a digital unit (not shown).

Antenna 562 may include one or more antennas, or antenna arrays, configured to send and/or receive wireless signals. Antenna 562 may be coupled to radio front end circuitry 590 and may be any type of antenna capable of transmitting and receiving data and/or signals wirelessly. In some embodiments, antenna 562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 562 may be separate from network node 560 and may be connectable to network node 560 through an interface or port. Certain embodiments of the present disclosure may be used with two-dimensional antenna arrays.

Antenna 562, interface 590, and/or processing circuitry 570 may be configured to perform any receiving operations and/or certain obtaining operations described herein as being performed by a network node. Any information, data and/or signals may be received from a wireless device, another network node and/or any other network equipment. Similarly, antenna 562, interface 590, and/or processing circuitry 570 may be configured to perform any transmitting operations described herein as being performed by a network node. Any information, data and/or signals may be transmitted to a wireless device, another network node and/or any other network equipment.

Power circuitry 587 may comprise, or be coupled to, power management circuitry and is configured to supply the components of network node 560 with power for performing the functionality described herein. Power circuitry 587 may receive power from power source 586. Power source 586 and/or power circuitry 587 may be configured to provide power to the various components of network node 560 in a form suitable for the respective components (e.g., at a voltage and current level needed for each respective component). Power source 586 may either be included in, or external to, power circuitry 587 and/or network node 560. For example, network node 560 may be connectable to an external power source (e.g., an electricity outlet) via an input circuitry or interface such as an electrical cable, whereby the external power source supplies power to power circuitry 587. As a further example, power source 586 may comprise a source of power in the form of a battery or battery pack which is connected to, or integrated in, power circuitry 587. The battery may provide backup power should the external power source fail. Other types of power sources, such as photovoltaic devices, may also be used.

Alternative embodiments of network node 560 may include additional components beyond those shown in FIG. 5 that may be responsible for providing certain aspects of the network node's functionality, including any of the functionality described herein and/or any functionality necessary to support the subject matter described herein. For example, network node 560 may include user interface equipment to allow input of information into network node 560 and to allow output of information from network node 560. This may allow a user to perform diagnostic, maintenance, repair, and other administrative functions for network node 560.

As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 510 includes antenna 511, interface 514, processing circuitry 520, device readable medium 530, user interface equipment 532, auxiliary equipment 534, power source 536 and power circuitry 537. Wireless device 510 may include multiple sets of one or more of the illustrated components for different wireless technologies supported by wireless device 510, such as, for example, GSM, WCDMA, LTE, NR, WiFi, WiMAX, or Bluetooth wireless technologies, just to mention a few. These wireless technologies may be integrated into the same or different chips or set of chips as other components within wireless device 510.

Antenna 511 may include one or more antennas or antenna arrays, configured to send and/or receive wireless signals, and is connected to interface 514. In certain alternative embodiments, antenna 511 may be separate from wireless device 510 and be connectable to wireless device 510 through an interface or port. Antenna 511, interface 514, and/or processing circuitry 520 may be configured to perform any receiving or transmitting operations described herein as being performed by a wireless device. Any information, data and/or signals may be received from a network node and/or another wireless device. In some embodiments, radio front end circuitry and/or antenna 511 may be considered an interface. Certain embodiments of the present disclosure may be used with two-dimensional antenna arrays.

As illustrated, interface 514 comprises radio front end circuitry 512 and antenna 511. Radio front end circuitry 512 comprise one or more filters 518 and amplifiers 516. Radio front end circuitry 514 is connected to antenna 511 and processing circuitry 520, and is configured to condition signals communicated between antenna 511 and processing circuitry 520. Radio front end circuitry 512 may be coupled to or a part of antenna 511. In some embodiments, wireless device 510 may not include separate radio front end circuitry 512; rather, processing circuitry 520 may comprise radio front end circuitry and may be connected to antenna 511.

Similarly, in some embodiments, some or all of RF transceiver circuitry 522 may be considered a part of interface 514. Radio front end circuitry 512 may receive digital data that is to be sent out to other network nodes or wireless devices via a wireless connection. Radio front end circuitry 512 may convert the digital data into a radio signal having the appropriate channel and bandwidth parameters using a combination of filters 518 and/or amplifiers 516. The radio signal may then be transmitted via antenna 511. Similarly, when receiving data, antenna 511 may collect radio signals which are then converted into digital data by radio front end circuitry 512. The digital data may be passed to processing circuitry 520. In other embodiments, the interface may comprise different components and/or different combinations of components.

Processing circuitry 520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 510 components, such as device readable medium 530, wireless device 510 functionality. Such functionality may include providing any of the various wireless features or benefits discussed herein. For example, processing circuitry 520 may execute instructions stored in device readable medium 530 or in memory within processing circuitry 520 to provide the functionality disclosed herein.

As illustrated, processing circuitry 520 includes one or more of RF transceiver circuitry 522, baseband processing circuitry 524, and application processing circuitry 526. In other embodiments, the processing circuitry may comprise different components and/or different combinations of components. In certain embodiments processing circuitry 520 of wireless device 510 may comprise a SOC. In some embodiments, RF transceiver circuitry 522, baseband processing circuitry 524, and application processing circuitry 526 may be on separate chips or sets of chips. In alternative embodiments, part or all of baseband processing circuitry 524 and application processing circuitry 526 may be combined into one chip or set of chips, and RF transceiver circuitry 522 may be on a separate chip or set of chips. In still alternative embodiments, part or all of RF transceiver circuitry 522 and baseband processing circuitry 524 may be on the same chip or set of chips, and application processing circuitry 526 may be on a separate chip or set of chips. In yet other alternative embodiments, part or all of RF transceiver circuitry 522, baseband processing circuitry 524, and application processing circuitry 526 may be combined in the same chip or set of chips. In some embodiments, RF transceiver circuitry 522 may be a part of interface 514. RF transceiver circuitry 522 may condition RF signals for processing circuitry 520.

In certain embodiments, some or all of the functionality described herein as being performed by a wireless device may be provided by processing circuitry 520 executing instructions stored on device readable medium 530, which in certain embodiments may be a computer-readable storage medium. In alternative embodiments, some or all of the functionality may be provided by processing circuitry 520 without executing instructions stored on a separate or discrete device readable storage medium, such as in a hard-wired manner. In any of those particular embodiments, whether executing instructions stored on a device readable storage medium or not, processing circuitry 520 can be configured to perform the described functionality. The benefits provided by such functionality are not limited to processing circuitry 520 alone or to other components of wireless device 510, but are enjoyed by wireless device 510 as a whole, and/or by end users and the wireless network generally.

Processing circuitry 520 may be configured to perform any determining, calculating, or similar operations (e.g., certain obtaining operations) described herein as being performed by a wireless device. These operations, as performed by processing circuitry 520, may include processing information obtained by processing circuitry 520 by, for example, converting the obtained information into other information, comparing the obtained information or converted information to information stored by wireless device 510, and/or performing one or more operations based on the obtained information or converted information, and as a result of said processing making a determination.

Device readable medium 530 may be operable to store a computer program, software, an application including one or more of logic, rules, code, tables, etc. and/or other instructions capable of being executed by processing circuitry 520. Device readable medium 530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 520. In some embodiments, processing circuitry 520 and device readable medium 530 may be considered to be integrated.

User interface equipment 532 may provide components that allow for a human user to interact with wireless device 510. Such interaction may be of many forms, such as visual, audial, tactile, etc. User interface equipment 532 may be operable to produce output to the user and to allow the user to provide input to wireless device 510. The type of interaction may vary depending on the type of user interface equipment 532 installed in wireless device 510. For example, if wireless device 510 is a smart phone, the interaction may be via a touch screen; if wireless device 510 is a smart meter, the interaction may be through a screen that provides usage (e.g., the number of gallons used) or a speaker that provides an audible alert (e.g., if smoke is detected). User interface equipment 532 may include input interfaces, devices and circuits, and output interfaces, devices and circuits. User interface equipment 532 is configured to allow input of information into wireless device 510, and is connected to processing circuitry 520 to allow processing circuitry 520 to process the input information. User interface equipment 532 may include, for example, a microphone, a proximity or other sensor, keys/buttons, a touch display, one or more cameras, a USB port, or other input circuitry. User interface equipment 532 is also configured to allow output of information from wireless device 510, and to allow processing circuitry 520 to output information from wireless device 510. User interface equipment 532 may include, for example, a speaker, a display, vibrating circuitry, a USB port, a headphone interface, or other output circuitry. Using one or more input and output interfaces, devices, and circuits, of user interface equipment 532, wireless device 510 may communicate with end users and/or the wireless network, and allow them to benefit from the functionality described herein.

Auxiliary equipment 534 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 534 may vary depending on the embodiment and/or scenario.

Power source 536 may, in some embodiments, be in the form of a battery or battery pack. Other types of power sources, such as an external power source (e.g., an electricity outlet), photovoltaic devices or power cells, may also be used. Wireless device 510 may further comprise power circuitry 537 for delivering power from power source 536 to the various parts of wireless device 510 which need power from power source 536 to carry out any functionality described or indicated herein. Power circuitry 537 may in certain embodiments comprise power management circuitry. Power circuitry 537 may additionally or alternatively be operable to receive power from an external power source; in which case wireless device 510 may be connectable to the external power source (such as an electricity outlet) via input circuitry or an interface such as an electrical power cable. Power circuitry 537 may also in certain embodiments be operable to deliver power from an external power source to power source 536. This may be, for example, for the charging of power source 536. Power circuitry 537 may perform any formatting, converting, or other modification to the power from power source 536 to make the power suitable for the respective components of wireless device 510 to which power is supplied.

For a radio propagation channel, there are typically a few distinct propagation paths over which a transmitted signal will propagate. These different paths will typically constitute different spatial directions, path loss and delay. When multi-beam precoders are applied to such a channel, it may be that for a given beam some of the propagation paths are clearly visible whereas some others are suppressed (e.g., due to the beam's beamforming gain varying with spatial direction). The existing propagation paths, however, are a consequence of the physical environment and hence common for all beams.

Certain embodiments of the present disclosure utilize this observation by creating a basis common for all beams which, at least partly, captures the propagation characteristics of the channel in the frequency domain. Hence, this basis is a representation of, potentially, all the propagation paths of the channel and its size is typically much smaller than if the entire channel space were described. Based on this common basis, a beam-specific selection can be performed, to describe the dominant components within each beam. The channel can then be described, for a given beam, as a combination of these selected beams.

To illustrate, assume that there are K PRBs and it is desired to represent $c_{l,i}(k)$ over these PRBs. In such a scenario, the steps can be generally described as follows: creating a first basis constituting K vectors spanning the K-dimensional space $\mathbb{C}^K$; from this first basis, selecting Kc<K vectors that are used to create a second basis, referred to as the common basis above, spanning a subset of the K-dimensional space $\mathbb{C}^K$; for each beam, selecting Kb<=Kc vectors from the second basis; and for each beam, representing $c_{l,i}$ as a linear combination of the Kb beams selected from the second basis.

More particularly, according to one example embodiment a wireless device (e.g., a UE), such as wireless device 510, may perform a method for transmitting a CSI report for a DL channel (e.g., to a network node, such as network node 560). The CSI report may indicate a plurality of precoder vectors. Each of the precoder vectors may correspond to a frequency sub-band of the bandwidth of the DL channel. In certain embodiments, a size of the frequency sub-band may be an integer number of PRBs. A precoder vector may be expressed as a linear combination of spatial-domain components and frequency-domain components. The plurality of precoder vectors may be indicated by indicating the frequency-domain components and a set of linear combination coefficients. In order to transmit the CSI report for the DL channel, wireless device 510 may perform the following steps, or a subset thereof.

According to this example embodiment, in a first step wireless device 510 obtains a first set of candidate frequency-domain components. A frequency-domain component may correspond to a basis vector and a set of frequency-domain components may correspond to a basis. In certain embodiments, the candidate frequency-domain components may be orthogonal basis vectors. In certain embodiments, the orthogonal basis vectors may be discrete Fourier transform vectors. As described in more detail below, as part of obtaining the first set of candidate frequency-domain components, wireless device 510 may define a first basis constituting a number of basis vectors. For example, in certain embodiments the first set of candidate frequency-domain components may be a first basis matrix B comprising K basis vectors.

To further illustrate this step, assume that there are K frequency-domain sub-bands, whereon it is desired to represent $c_{l,i}(k)$, and that the size of the frequency sub-band may for instance be one PRB, or a number of PRBs, and may or may not relate to some other configured quantity. In this step, wireless device 510 obtains a first set of candidate frequency-domain components (i.e., a first basis, which in one example is for the entire channel space). In certain embodiments, the first basis constituting a number of basis vectors spanning the K-dimensional space $\mathbb{C}^K$ may be defined. This basis could, for instance, be a DFT matrix created by concatenating a set of DFT beams:

$$w_{1D}(j) \text{ for } j = 0, 1, \ldots Q_f K - 1,$$

where $Q_f$ is an oversampling factor. In certain embodiments, the basis may be described by:

$$B = [w_{1D}(0) \quad w_{1D}(1) \quad \ldots \quad w_{1D}(Q_f K - 1)],$$

implying that there are $Q_f K$ vectors in the basis. Such a basis is known as an oversampled DFT basis.

In some cases, it may be desirable to work with an orthogonal DFT basis rather than an oversampled DFT basis. In such cases, an orthogonal DFT basis may be obtained by selecting the DFT vectors with indices satisfying $i = Q_f k + q$, $k = 0, \ldots, K-1$ for some value of $q = 0, \ldots, Q_f - 1$. The parameter q is known as a rotation factor and a basis obtained for different values of q are known as a rotated DFT basis.

Thus, in certain embodiments, the first set of candidate frequency-domain components may correspond to an oversampled DFT basis. In other embodiments, the first set of candidate frequency-domain components may correspond to an orthogonal DFT basis (i.e., that the basis comprises K orthogonal DFT vectors of length K). In some such embodiments, the orthogonal DFT basis may be obtained as a rotated DFT basis by determining a rotation factor q. In other such embodiments, an oversampling factor of $Q_f=1$ may be used, which may imply that the basis is fixed in a specification.

In certain embodiments, alternative structures may be used for creating the basis, such as Discrete Cosine Transform (DCT) vectors.

The present disclosure contemplates that wireless device 510 may obtain the first set of candidate frequency-domain components in a variety of ways, and that the manner in which wireless device 510 obtains the first set of candidate frequency-domain components may vary in different implementations. As one example, wireless device 510 may obtain the first set of candidate frequency-domain components by accessing a predefined table (e.g., a predefined table in the specification). As another example, wireless device 510 may obtain the first set of candidate frequency-domain components via higher layer signaling. As still another example, wireless device 510 may obtain the first set of candidate frequency-domain components by determining the first set of candidate frequency-domain components.

For instance, the first set of candidate frequency-domain components may correspond to either the full frequency-domain basis (which may be used when the bandwidth is small) or a rank-common frequency-domain basis subset (which may be used when the bandwidth is large). In certain embodiments, if the first set of candidate frequency-domain components corresponds to the full frequency-domain basis, the first set of candidate frequency-domain components may be fixed (e.g., in the specification) and hence may not be determined by wireless device 510. Rather, in such a scenario wireless device 510 may obtain the first set of candidate frequency-domain components by accessing a predefined table or via higher layer signaling. In certain embodiments, if the first set of candidate frequency-domain components corresponds to the intermediary rank-common frequency-domain basis subset, wireless device 510 may determine the first set of candidate frequency-domain components.

In certain embodiments, K may be specified in the standard. In certain embodiments, K may be configurable. In certain embodiments, K may be rank dependent and may be thus be expressed as K(r), where r is the rank. In certain embodiments, B may be rank dependent and written B(r). In one such embodiment, B(r2) may comprises fewer columns than B(r1) when r2>r1.

In a second step, wireless device 510 determines a set of spatial-domain components. In certain embodiments, the set of spatial-domain components may correspond to the L beams, which are determined by wireless device 510.

In the third step, wireless device 510 determines a second set of candidate frequency-domain components as a subset of the first set of candidate frequency-domain components. In this step, a subset of the first set of candidate frequency-domain components may be selected by wireless device 510 to form a second set of candidate frequency-domain components (i.e., create a common basis for all beams or spatial-domain components). In certain embodiments, wireless device 510 may analyze an estimate of the DL channel to determine one or more properties of the DL channel and select the second set of candidate frequency-domain components from the first set of candidate frequency-domain components based on the determined one or more properties of the DL channel.

As described in more detail below, in certain embodiments, in determining the second set of candidate frequency-domain components as a subset of the first set of candidate frequency-domain components, wireless device 510 may create a common basis for all spatial-domain components. For example, wireless device 510 may select $K_c<K$ columns of the first basis matrix B described above and concatenate the selected columns $K_c$ to form a common basis matrix $B_c$. In certain embodiments, the common basis matrix $B_c$ may be chosen per one or more of polarization and layer.

To further illustrate this step, consider the case when the first basis (described above) contains K basis vectors. A selection of $K_c<K$ out of the K vectors may be performed. In certain embodiments, these Kc selected basis vectors then form a second basis (which may be referred to herein as the common basis or the second set of candidate frequency-domain components). Using a matrix representation, the subset selection can be seen as selecting $K_c<K$ columns of the first basis matrix B and concatenating these columns to form the common basis matrix $B_c$. For instance, the selection can be represented as a function $I_c(m)$ being a mapping from an integer m to an integer value $I_c(m)$, such that $I_c(m)$ is defined for $0 \leq m \leq K_c-1$ and $0 \leq I_c(m) \leq K-1$ where it may also be so that $I_c(m_1) \neq I_c(m_2)$ when $m_1 \neq m_2$. This selection function may then be used to describe the common basis as:

$$B_C = [B(I_c(0)) \quad B(I_c(1)) \quad \ldots \quad B(I_c(K_c-1))],$$

where B(m) denotes the m:th column of the matrix B. Note that $B_C$ will span a subset of space spanned by B.

Note further that there will be in total $$\binom{K}{Kc}$$

possible selections (where $$\binom{A}{B} = \frac{A!}{B!(A-B)!})$$

and hence also selection functions $I_c(m)$. One of these selections can be represented using $$\left\lceil \log 2\left(\binom{K}{Kc}\right) \right\rceil \text{bits},$$

for instance using a combinatorial number system. In certain embodiments, wireless device 510 may perform this selection, represent it using a number of bits and then signal this information to network node 560 (e.g., a gNB), for example as part of the CSI report.

In certain embodiments, the common basis $B_C$ represents the channel and as such it may be used for both polarizations and all layers in the precoder. In certain embodiments, however, $B_C$ may instead be chosen per polarization and/or layer.

The present disclosure contemplates that Kc may be determined in any suitable manner. As one example, Kc may be specified in the standard. As another example, Kc may be configurable. As still another example, Kc may be rank dependent and may be thus be expressed as Kc(r).

In the fourth step, wireless device 510 determines, for each spatial-domain component of the set of spatial-domain components, a spatial-domain component-specific set of frequency-domain components as a subset of the second set of candidate frequency-domain components. In certain embodiments, each frequency-domain component in the spatial-domain component-specific set of frequency-domain components may be associated with a non-zero coefficient of the set of linear combination coefficients. In certain embodiments, wireless device 510 may determine if the associated one or more linear combining coefficients are non-zero.

In determining the spatial-domain component-specific set of frequency-domain components, wireless device 510 may perform a beam-specific selection of the columns from the common basis. For example, a beam-specific basis selection may be made by wireless device 510 from the second set of candidate frequency-domain components, which may in certain embodiments be realized as a selection of columns from the common basis $B_c$ described above.

In some cases, it may be so that beam i selects $K_b(i)$ out of the $K_c$ basis vectors from the common basis, where Kb(i)≤Kc, and these $K_b(i)$ vectors will then represent a beam-specific basis for beam i=0, . . . , 2L−1.

If, for instance, the beam-specific selection is represented as a function $I_b(i, m)$ being a mapping from an integer m to an integer value $I_b(i, m)$, such that $I_b(i, m)$ is defined for $0 \leq m \leq K_b(i)-1$ and $1 \leq I_b(i, m) \leq K_c$, where it may also be so that $I_b(i, m_1) \neq I_b(i, m_2)$ when $m_1 \neq m_2$. The selection function could be used to describe the beam specific basis as:

$$B_i = [B_c(I_b(i, 0)) \quad B_c(I_b(i, 1)) \quad \ldots \quad B_c(I_b(i, Kb(i)-1))],$$

Note that there will be in total $$\binom{K_c}{K_b(i)}$$

possible selections and hence also selection functions $I_b(i, m)$ meaning that it can be represented using $$\left\lceil \log2\left(\binom{Kc}{Kb(i)}\right) \right\rceil \text{ bits.}$$

In certain embodiments, wireless device 510 may perform this selection, represent it using a number of bits, and then signal this information to network node 560 (e.g., a gNB), for example as part of the CSI report.

In certain embodiments, $B_i=B_{i+L}$, implying that the different polarizations of the precoder share the same frequency-domain basis selection. Hence, there may be only one beam-specific frequency-domain basis used by beams corresponding to different polarizations.

In certain embodiments, wireless device 510 may derive $c_{l,i}$ for each beam such that $c_{l,i}$ is a linear combination of the $K_b(i)$ frequency-domain basis vectors selected as described above. Hence, it is assumed that $c_{l,i}=B_i a_{l,i}$ where $a_{l,i}$ is a $K_b(i) \times 1$ vector of complex values.

In certain embodiments, wireless device 510 may derive a complex valued vector $a_{l,i}$ and also create a quantized version of it denoted ã(l, i). This quantized vector ã(l, i) can be represented with a finite set of bits that could be signaled by wireless device 510 to network node 560 (e.g., a gNB), for example as part of the CSI report.

As described above, in certain embodiments wireless device 510 may determine if the associated one or more linear combining coefficients are non-zero. For example, in certain embodiments wireless device 510 may determine linear combining coefficients for each combination of frequency-domain components of the second set of candidate frequency-domain components and spatial-domain components. Wireless device 510 may inspect the amplitude of the determined linear combining coefficients, quantize the amplitude of the coefficients, and determine that amplitudes that are below a threshold are regarded as zero coefficients. In certain embodiments, wireless device 510 will only include the frequency-domain components corresponding to non-zero coefficients in the spatial-domain component-specific set of frequency-domain components.

In certain embodiments, wireless device 510 may be configured to consider some coefficients as zero even if the quantized amplitude is not zero. This may be due to a limit imposed on how many non-zero coefficients, $K_{nz}$, that wireless device 510 can report. In such a case, wireless device 510 may sort the coefficients according to amplitude and set the $2LK_c-K_{nz}$ weakest coefficients as zero coefficients.

In a fifth step, wireless device 510 then transmits, to network node 560, the CSI report. In certain embodiments, the CSI report may comprise an indication of: the determined second set of candidate frequency-domain components; the determined spatial-domain component-specific sets of frequency-domain components; and the non-zero coefficients of the set of linear combination coefficients.

Although the description of the example embodiment above describes first, second, third, fourth, and fifth steps, this is for ease of explanation only and is not intended to limit the scope of the present disclosure to the precise order of steps described herein. Rather, the present disclosure contemplates that the steps of the example embodiment described above may be performed in any suitable order. For instance, in some embodiments the wireless device may perform the steps jointly or in a different order.

Although the description of the example embodiment above described a separate encoding of the information obtained by $I_c(m)$, $I_b(i, m)$ and $a_{l,i}$, in some cases it may be beneficial to instead conduct a joint encoding of these entities.

Thus, in certain embodiments the determined beam-specific basis selections $I_b(i, m)$, $0 \leq m \leq K_b(i)-1$ for all the beams i=0, . . . , 2L−1 may be jointly encoded into a single parameter, mapped to a number of bits, and fed back as part of the CSI report.

In certain embodiments, the determined beam-specific basis selections $I_b(i, m)$, $0 \leq m \leq K_b(i)-1$ as well as an indication of $K_b(i)$ may be jointly encoded into a single parameter, mapped to a number of bits, and fed back as part of the CSI report.

In certain embodiments, the determined beam-specific basis selections may be jointly encoded with an indication of which, if any, linear combining coefficients $a_{l,i,m}$ are non-zero.

According to another example embodiment, a network node, such network node 560 (e.g., a gNB), may perform a method for receiving a CSI report for a DL channel. The CSI report may indicate a plurality of precoder vectors. Each of the precoder vectors may correspond to a frequency sub-band of the bandwidth of the downlink channel. In certain embodiments, a size of the frequency sub-band may be an integer number of PRBs. A precoder vector may be expressed as a linear combination of spatial-domain components and frequency-domain components. The plurality of precoder vectors may be indicated by indicating the frequency-domain components and a set of linear combination coefficients.

According to this example embodiment, network node 560 receives, from a wireless device, such as wireless device 510 (e.g., a UE), the CSI report. The CSI report may comprise an indication of: a second set of candidate frequency-domain components being a subset of a first set of candidate frequency-domain components; one or more spatial-domain component-specific sets of frequency-domain components being subsets of the second set of candidate frequency-domain components, each frequency-domain component in the one or more spatial-domain component-specific sets of frequency-domain components being associated with non-zero coefficients of the set of linear combination coefficients; and the non-zero coefficients.

Network node 560 determines one or more precoder vectors based upon the indication received in the CSI report.

In certain embodiments, network node 560 may use one of the determined one or more precoder vectors to perform a transmission to wireless device 510.

In certain embodiments, network node 560 may use a different precoder vector from the one or more determined precoder vectors to perform a transmission to wireless device 510.

In certain embodiments, network node 560 may perform the following steps (or a subset thereof) to determine the one or more precoder vectors based upon the indication received in the CSI report. Network node 560 may determine, from the spatial-domain component-specific subset of frequency-domain components, one or more spatial-domain components. Each component in the spatial-domain component-specific subset of frequency-domain components may be associated with one or more linear combining coefficients. Network node 560 may determine a first set of candidate frequency-domain components. The first set of candidate frequency-domain components may include the second set of candidate frequency-domain components. Network node 560 may determine a set of spatial-domain components.

In certain embodiments, the candidate frequency-domain components may be orthogonal basis vectors. In certain embodiments, the orthogonal basis vectors may be discrete Fourier transform vectors.

In certain embodiments, a size of the frequency sub-band may be one PRB. In certain embodiments, a size of the frequency sub-band may be an integer number of PRBs.

Figure 6:
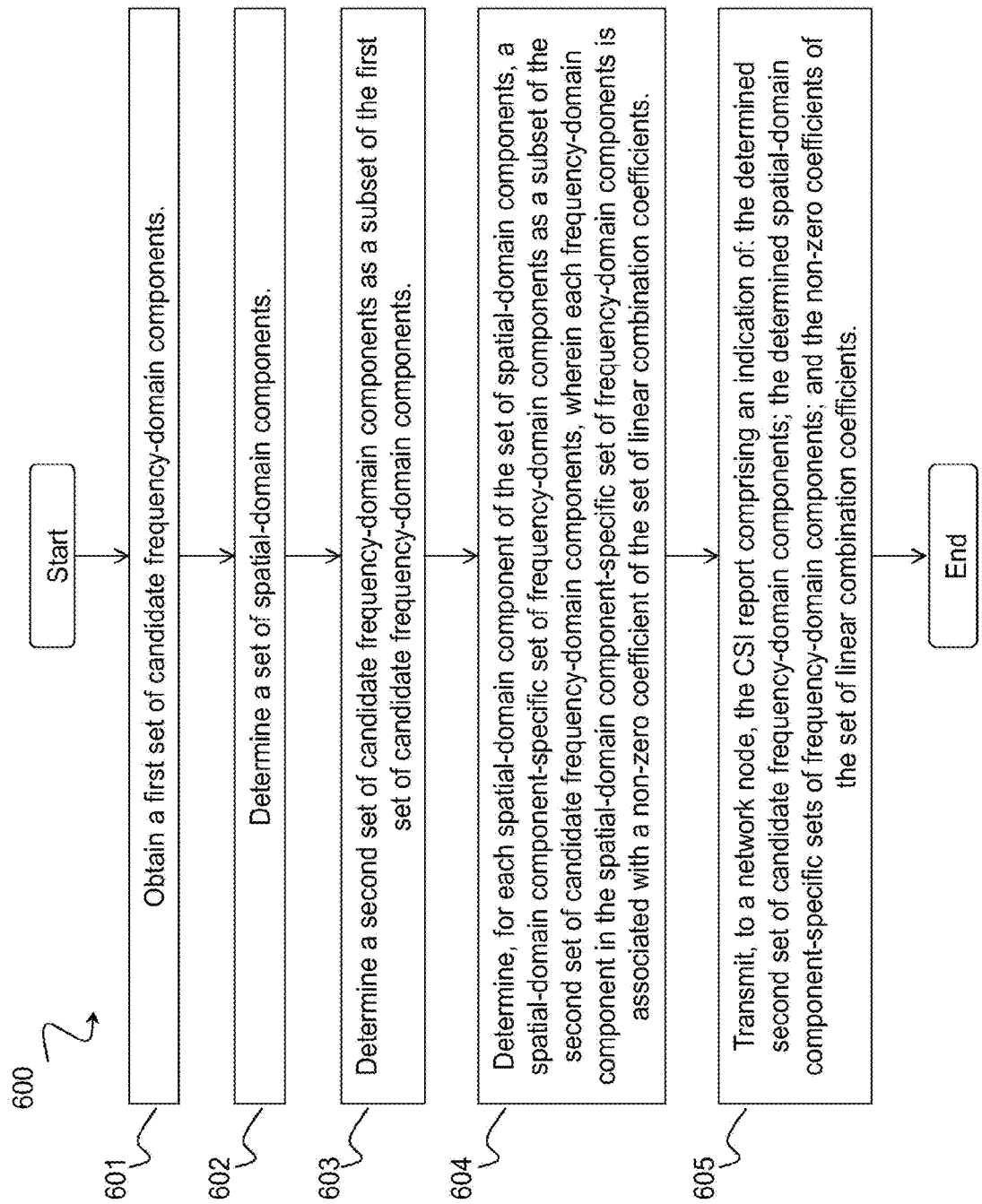
FIG. 6 is a flowchart illustrating an example of a method performed by a wireless device, in accordance with certain embodiments.

FIG. 6 is a flowchart illustrating an example of a method 600 performed by a wireless device, in accordance with certain embodiments. More particularly, FIG. 6 illustrates a method 600 performed by a wireless device for transmitting a CSI report for a DL channel. The CSI report indicates a plurality of precoder vectors. Each of the precoder vectors corresponds to a frequency sub-band of the bandwidth of the DL channel. A precoder vector is expressed as a linear combination of spatial-domain components and frequency-domain components. Indicating the plurality of precoder vectors comprises indicating the frequency-domain components and a set of linear combination coefficients.

Method 600 begins at step 601, where the wireless device obtains a first set of candidate frequency-domain components. In certain embodiments, the candidate frequency-domain components may be orthogonal basis vectors. In certain embodiments, the orthogonal basis vectors may be discrete Fourier transform vectors. In certain embodiments, a size of the frequency sub-band may be an integer number of PRBs.

In certain embodiments, obtaining the first set of candidate frequency-domain components may comprise defining a first basis constituting a number of basis vectors.

In certain embodiments, obtaining the first set of candidate frequency-domain components may comprise one of: obtaining the first set of candidate frequency-domain components by accessing a predefined table; obtaining the first set of candidate frequency-domain components via higher layer signaling; and determining the first set of candidate frequency-domain components.

At step 602, the wireless device determines a set of spatial-domain components.

At step 603, the wireless device determines a second set of candidate frequency-domain components as a subset of the first set of candidate frequency-domain components. In certain embodiments, determining the second set of candidate frequency-domain components as a subset of the first set of candidate frequency-domain components may comprise: analyzing an estimate of the DL channel to determine one or more properties of the DL channel; and selecting the second set of candidate frequency-domain components from the first set of candidate frequency-domain components based on the determined one or more properties of the DL channel.

In certain embodiments, determining the second set of candidate frequency-domain components as a subset of the first set of candidate frequency-domain components may comprise creating a common basis for all spatial-domain components.

At step 604, the wireless device determines, for each spatial-domain component of the set of spatial-domain components, a spatial-domain component-specific set of frequency-domain components as a subset of the second set of candidate frequency-domain components, wherein each frequency-domain component in the spatial-domain component-specific set of frequency-domain components is associated with a non-zero coefficient of the set of linear combination coefficients. In certain embodiments, determining the spatial-domain component-specific set of frequency-domain components may comprise determining if the associated one or more linear combining coefficients are non-zero.

In certain embodiments, the first set of candidate frequency-domain components may be a first basis matrix B comprising K basis vectors. In certain embodiments, determining the second set of candidate frequency-domain components as the subset of the first set of candidate frequency-domain components may comprise selecting $K_c < K$ columns of the first basis matrix B and concatenating the selected columns $K_c$ to form a common basis matrix $B_c$. In certain embodiments, the common basis matrix $B_c$ may be chosen per one or more of polarization and layer. In certain embodiments, determining the spatial-domain component-specific frequency-domain components may comprise selecting a selection of columns from the common basis matrix $B_c$.

At step 605, the wireless device transmits, to a network node, the CSI report comprising an indication of: the determined second set of candidate frequency-domain components; the determined spatial-domain component-specific sets of frequency-domain components; and the non-zero coefficients of the set of linear combination coefficients.

Figure 7:
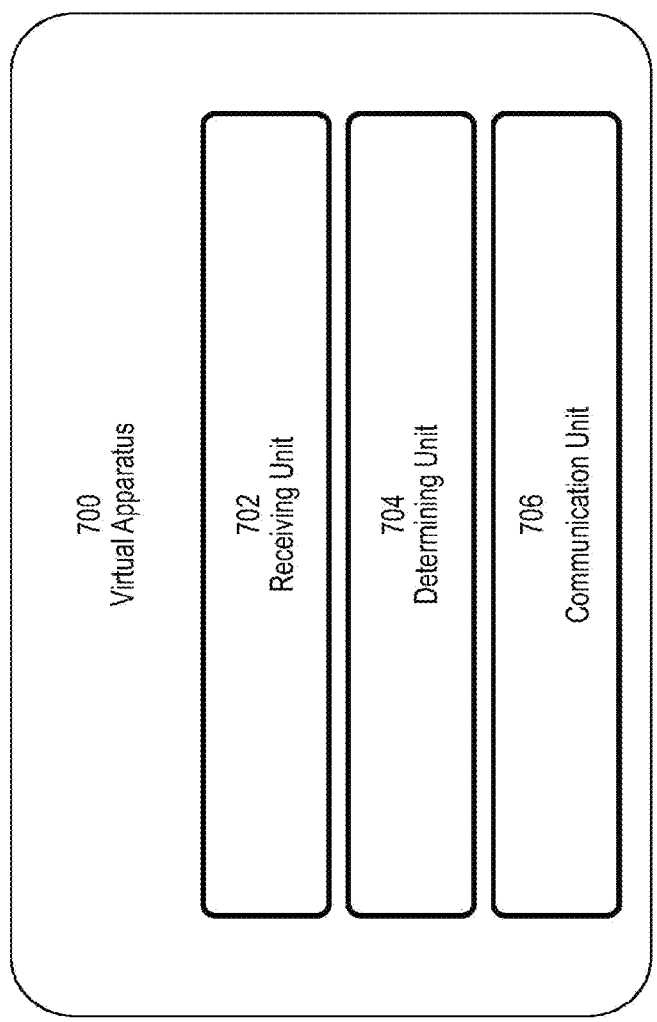
FIG. 7 is a block diagram illustrating an example of a virtual apparatus, in accordance with certain embodiments.

FIG. 7 is a block diagram illustrating an example of a virtual apparatus, in accordance with certain embodiments. More particularly, FIG. 7 illustrates a schematic block diagram of an apparatus 700 in a wireless network (for example, the wireless network shown in FIG. 5). The apparatus may be implemented in a wireless device (e.g., wireless device 510 shown in FIG. 5). Apparatus 700 is operable to carry out the example method described with reference to FIG. 6 and possibly any other processes or methods disclosed herein. It is also to be understood that the method of FIG. 6 is not necessarily carried out solely by apparatus 700. At least some operations of the method can be performed by one or more other entities.

Virtual Apparatus 700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 702, determining unit 704, communication unit 706, and any other suitable units of apparatus 700 to perform corresponding functions according one or more embodiments of the present disclosure.

In certain embodiments, apparatus 700 may be a UE. In certain embodiments, apparatus 700 may be configured to perform a method for transmitting a CSI report for a DL channel. The CSI report may indicate a plurality of precoder vectors. Each of the precoder vectors may correspond to a frequency sub-band of the bandwidth of the DL channel. In certain embodiments, a size of the frequency sub-band is an integer number of PRBs. A precoder vector may be expressed as a linear combination of spatial-domain components and frequency-domain components. Indicating the plurality of precoder vectors may comprise indicating the frequency-domain components and a set of linear combination coefficients.

As illustrated in FIG. 7, apparatus 700 includes receiving unit 702, determining unit 704, and communication unit 706. Receiving unit 702 may be configured to perform the receiving functions of apparatus 700. For example, receiving unit 702 may be configured to receive a channel. As another example, receiving unit 702 may be configured to obtain a first set of candidate frequency-domain components. In certain embodiments, receiving unit 702 may be configured to receive the first set of candidate frequency-domain components (e.g., via higher layer signalling).

Receiving unit 702 may receive any suitable information (e.g., from another wireless device or a network node). Receiving unit 702 may include a receiver and/or a transceiver, such as RF transceiver circuitry 522 described above in relation to FIG. 5. Receiving unit 702 may include circuitry configured to receive messages and/or signals (wireless or wired). In particular embodiments, receiving unit 702 may communicate received messages and/or signals to determining unit 704 and/or any other suitable unit of apparatus 700. The functions of receiving unit 702 may, in certain embodiments, be performed in one or more distinct units.

Determining unit 704 may perform the processing functions of apparatus 700. For example, determining unit 704 may be configured to obtain a first set of candidate frequency-domain components. In certain embodiments, determining unit 704 may be configured to define a first basis matrix constituting a number of basis vectors. In certain embodiments, determining unit 704 may be configured to obtain the first set of candidate frequency-domain components by accessing a predefined table. In certain embodiments, determining unit 704 may be configured to obtain the first set of candidate frequency-domain components by determining the first set of candidate frequency-domain components. In certain embodiments, determining unit 704 may be configured to obtain the first set of candidate frequency-domain components via higher layer signalling.

In certain embodiments, the candidate frequency-domain components may be orthogonal basis vectors. In certain embodiments, the orthogonal basis vectors may be discrete Fourier transform vectors.

As another example, determining unit 704 may be configured to determine a set of spatial-domain components.

As still another example, determining unit 704 may be configured to determine a second set of candidate frequency-domain components as a subset of the first set of candidate frequency-domain components. In certain embodiments, determining unit 704 may be configured to estimate a DL channel. In certain embodiments, determining unit 704 may be configured to analyze an estimate of the DL channel to determine one or more properties of the DL channel and to select the second set of candidate frequency-domain components from the first set of candidate frequency-domain components based on the determined one or more properties of the DL channel.

In certain embodiments, determining unit 704 may be configured to create a common basis for all spatial-domain components. In certain embodiments, the first set of candidate frequency-domain components may be a first basis matrix B comprising K basis vectors. Determining unit 704 may be configured to select $K_c < K$ columns of the first basis matrix B. Determining unit 704 may be configured to concatenate the selected columns $K_c$ to form a common basis matrix $B_c$. In certain embodiments, the common basis matrix $B_c$ may be chosen per one or more of polarization and layer.

As yet another example, determining unit 704 may be configured to determine, for each spatial-domain component of the set of spatial-domain components, a spatial-domain component-specific set of frequency-domain components as a subset of the second set of candidate frequency-domain components, wherein each frequency-domain component in the spatial-domain component-specific set of frequency-domain components is associated with a non-zero coefficient of the set of linear combination coefficients. In certain embodiments, determining unit 704 may be configured to determine if the associated one or more linear combining coefficients are non-zero. In certain embodiments, determining unit 704 may be configured to select a selection of columns from the common basis matrix $B_C$.

As another example, determining unit 704 may be configured to generate a CSI report. The CSI report may comprise an indication of: the determined second set of candidate frequency-domain components; the determined spatial-domain component-specific sets of frequency-domain components; and the non-zero coefficients of the set of linear combination coefficients.

As another example, determining unit 704 may be configured to provide user data.

Determining unit 704 may include or be included in one or more processors, such as processing circuitry 520 described above in relation to FIG. 5. Determining unit 704 may include analog and/or digital circuitry configured to perform any of the functions of determining unit 704 and/or processing circuitry 520 described above. The functions of determining unit 704 may, in certain embodiments, be performed in one or more distinct units.

Communication unit 706 may be configured to perform the transmission functions of apparatus 700. For example, communication unit 706 may be configured to transmit, to a network node, the CSI report comprising an indication of: the determined second set of candidate frequency-domain components; the determined spatial-domain component-specific sets of frequency-domain components; and the non-zero coefficients of the set of linear combination coefficients. As another example, communication unit 706 may be configured to forward user data to a host computer via a transmission to a network node.

Communication unit 706 may transmit messages (e.g., to another wireless device and/or a network node). Communication unit 706 may include a transmitter and/or a transceiver, such as RF transceiver circuitry 522 described above in relation to FIG. 5. Communication unit 706 may include circuitry configured to transmit messages and/or signals (e.g., through wireless or wired means). In particular embodiments, communication unit 706 may receive messages and/or signals for transmission from determining unit 704 or any other unit of apparatus 700. The functions of communication unit 704 may, in certain embodiments, be performed in one or more distinct units.

Figure 8:
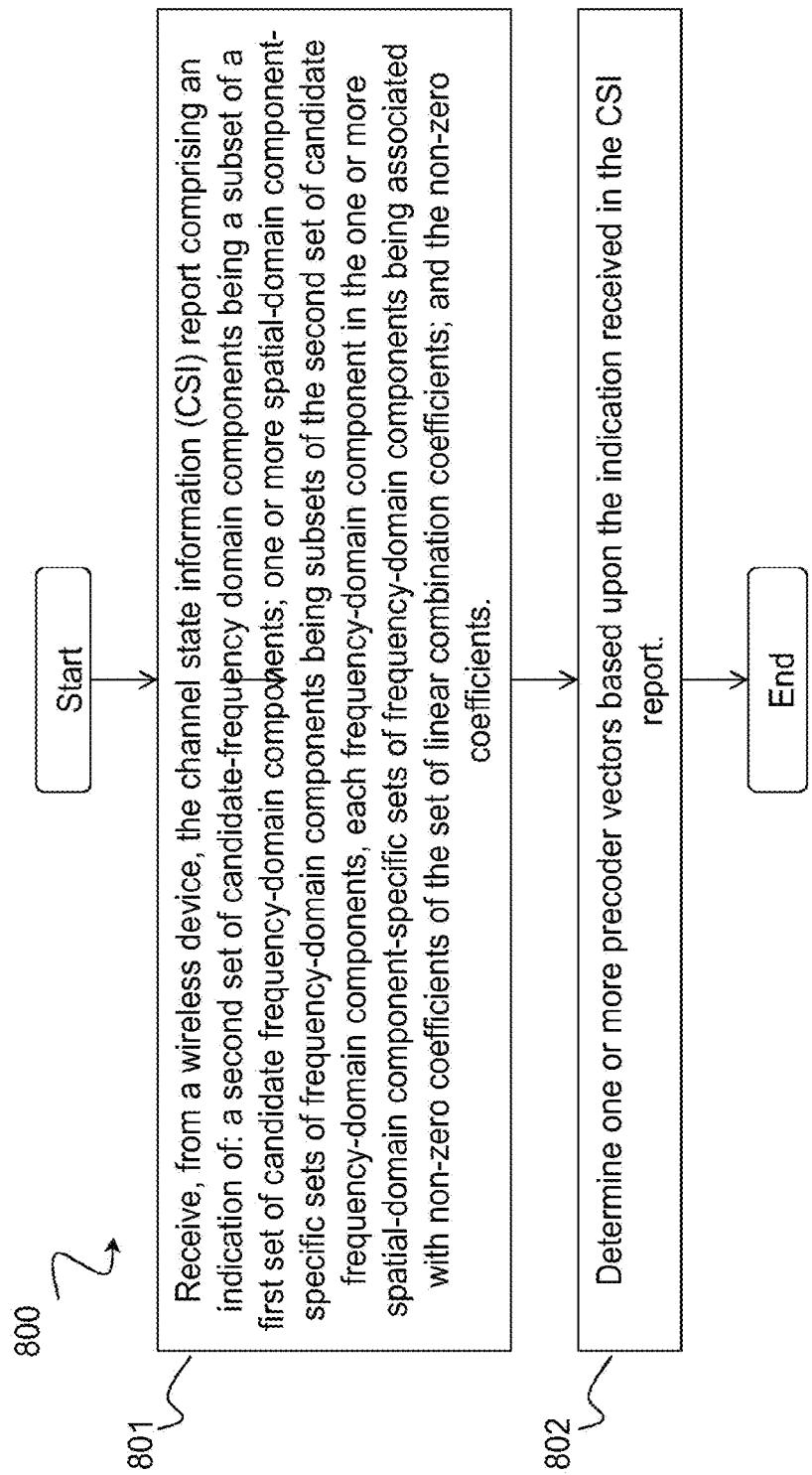
FIG. 8 is a flowchart illustrating an example of a method performed by a network node, in accordance with certain embodiments.

FIG. 8 is a flowchart illustrating an example of a method 800 performed by a network node, in accordance with certain embodiments. More particularly, FIG. 8 illustrates a method 800 performed by a network node for receiving a CSI report for a DL channel. The CSI report indicates a plurality of precoder vectors. Each of the precoder vectors corresponds to a frequency sub-band of the bandwidth of the DL channel. A precoder vector is expressed as a linear combination of spatial-domain components and frequency-domain components. Indicating the plurality of precoder vectors comprises indicating the frequency-domain components and a set of linear combination coefficients.

Method 800 begins at step 801, where the network node receives, from a wireless device, the CSI report comprising an indication of: a second set of candidate frequency-domain components being a subset of a first set of candidate frequency-domain components; one or more spatial-domain component-specific sets of frequency-domain components being subsets of the second set of candidate frequency-domain components, each frequency-domain component in the one or more spatial-domain component-specific sets of frequency-domain components being associated with non-zero coefficients of the set of linear combination coefficients; and the non-zero coefficients.

In certain embodiments, a size of the frequency sub-band may be an integer number of PRBs.

At step 802, the network node determines one or more precoder vectors based upon the indication received in the CSI report.

In certain embodiments, the method may further comprise using one of the determined one or more precoder vectors to perform a transmission to the wireless device.

In certain embodiments, the method may further comprise using a different precoder vector from the one or more determined precoder vectors to perform a transmission to the wireless device.

Figure 9:
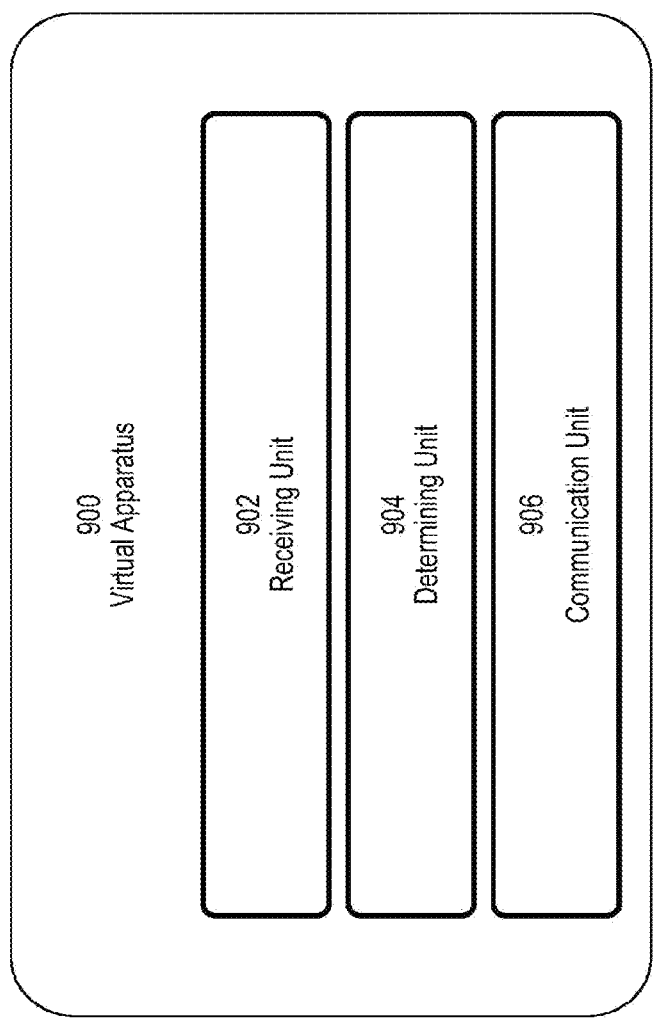
FIG. 9 is a block diagram illustrating an example of a virtual apparatus, in accordance with certain embodiments.

FIG. 9 is a block diagram illustrating an example of a virtual apparatus, in accordance with certain embodiments. More particularly, FIG. 9 illustrates a schematic block diagram of an apparatus 900 in a wireless network (for example, the wireless network shown in FIG. 5). The apparatus may be implemented in a network node (e.g., network node 560 shown in FIG. 5). Apparatus 900 is operable to carry out the example method described with reference to FIG. 8 and possibly any other processes or methods disclosed herein. It is also to be understood that the method of FIG. 8 is not necessarily carried out solely by apparatus 900. At least some operations of the method can be performed by one or more other entities.

Virtual Apparatus 900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 902, determining unit 904, communication unit 906, and any other suitable units of apparatus 900 to perform corresponding functions according one or more embodiments of the present disclosure.

In certain embodiments, apparatus 900 may be an eNB or a gNB. Apparatus 900 may be configured to perform a method for receiving a CSI report for a DL channel. The CSI report may indicate a plurality of precoder vectors. Each of the precoder vectors may correspond to a frequency sub-band of the bandwidth of the DL channel. In certain embodiments, a size of the frequency sub-band may be an integer number of PRBs. A precoder vector may be expressed as a linear combination of spatial-domain components and frequency-domain components. Indicating the plurality of precoder vectors may comprise indicating the frequency-domain components and a set of linear combination coefficients.

As illustrated in FIG. 9, apparatus 900 includes receiving unit 902, determining unit 904, and communication unit 906. Receiving unit 902 may be configured to perform the receiving functions of apparatus 900. For example, receiving unit 902 may be configured to receive, from a wireless device, the CSI report comprising an indication of: a second set of candidate frequency-domain components being a subset of a first set of candidate frequency-domain components; one or more spatial-domain component-specific sets of frequency-domain components being subsets of the second set of candidate frequency-domain components, each frequency-domain component in the one or more spatial-domain component-specific sets of frequency-domain components being associated with non-zero coefficients of the set of linear combination coefficients; and the non-zero coefficients. As another example, receiving unit 902 may be configured to obtain user data.

Receiving unit 902 may receive any suitable information (e.g., from a wireless device or another network node). Receiving unit 902 may include a receiver and/or a transceiver, such as RF transceiver circuitry 572 described above in relation to FIG. 5. Receiving unit 902 may include circuitry configured to receive messages and/or signals (wireless or wired). In particular embodiments, receiving unit 902 may communicate received messages and/or signals to determining unit 904 and/or any other suitable unit of apparatus 900. The functions of receiving unit 902 may, in certain embodiments, be performed in one or more distinct units.

Determining unit 904 may perform the processing functions of apparatus 900. For example, determining unit 904 may be configured to determine one or more precoder vectors based upon the indication received in the CSI report.

In certain embodiments, determining unit 904 may be configured to determine, from the spatial-domain component-specific subset of frequency-domain components, one or more spatial-domain components, wherein each component in the spatial-domain component-specific subset of frequency-domain components is associated with one or more linear combining coefficients. In certain embodiments, determining unit 904 may be configured to determine a first set of candidate frequency-domain components, the first set of candidate frequency-domain components comprising the second set of candidate frequency-domain components. In certain embodiments, determining unit 904 may be configured to determine a set of spatial-domain components.

As another example, determining unit 904 may be configured to use one of the determined one or more precoder vectors to perform a transmission to the wireless device. As another example, determining unit 904 may be configured to use a different precoder vector from the one or more determined precoder vectors to perform a transmission to the wireless device.

As another example, determining unit 904 may be configured to obtain user data.

Determining unit 904 may include or be included in one or more processors, such as processing circuitry 570 described above in relation to FIG. 5. Determining unit 904 may include analog and/or digital circuitry configured to perform any of the functions of determining unit 904 and/or processing circuitry 170 described above. The functions of determining unit 904 may, in certain embodiments, be performed in one or more distinct units.

Communication unit 906 may be configured to perform the transmission functions of apparatus 900. For example, communication unit 906 may be configured to use one of the determined one or more precoder vectors to perform a transmission to the wireless device. As another example, communication unit 906 may be configured to use a different precoder vector from the one or more determined precoder vectors to perform a transmission to the wireless device. As another example, communication unit 906 may be configured to forward the user data to a host computer or a wireless device.

Communication unit 906 may transmit messages (e.g., to a wireless device and/or another network node). Communication unit 906 may include a transmitter and/or a transceiver, such as RF transceiver circuitry 572 described above in relation to FIG. 5. Communication unit 906 may include circuitry configured to transmit messages and/or signals (e.g., through wireless or wired means). In particular embodiments, communication unit 906 may receive messages and/or signals for transmission from determining unit 904 or any other unit of apparatus 900. The functions of communication unit 904 may, in certain embodiments, be performed in one or more distinct units.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

Figure 10:
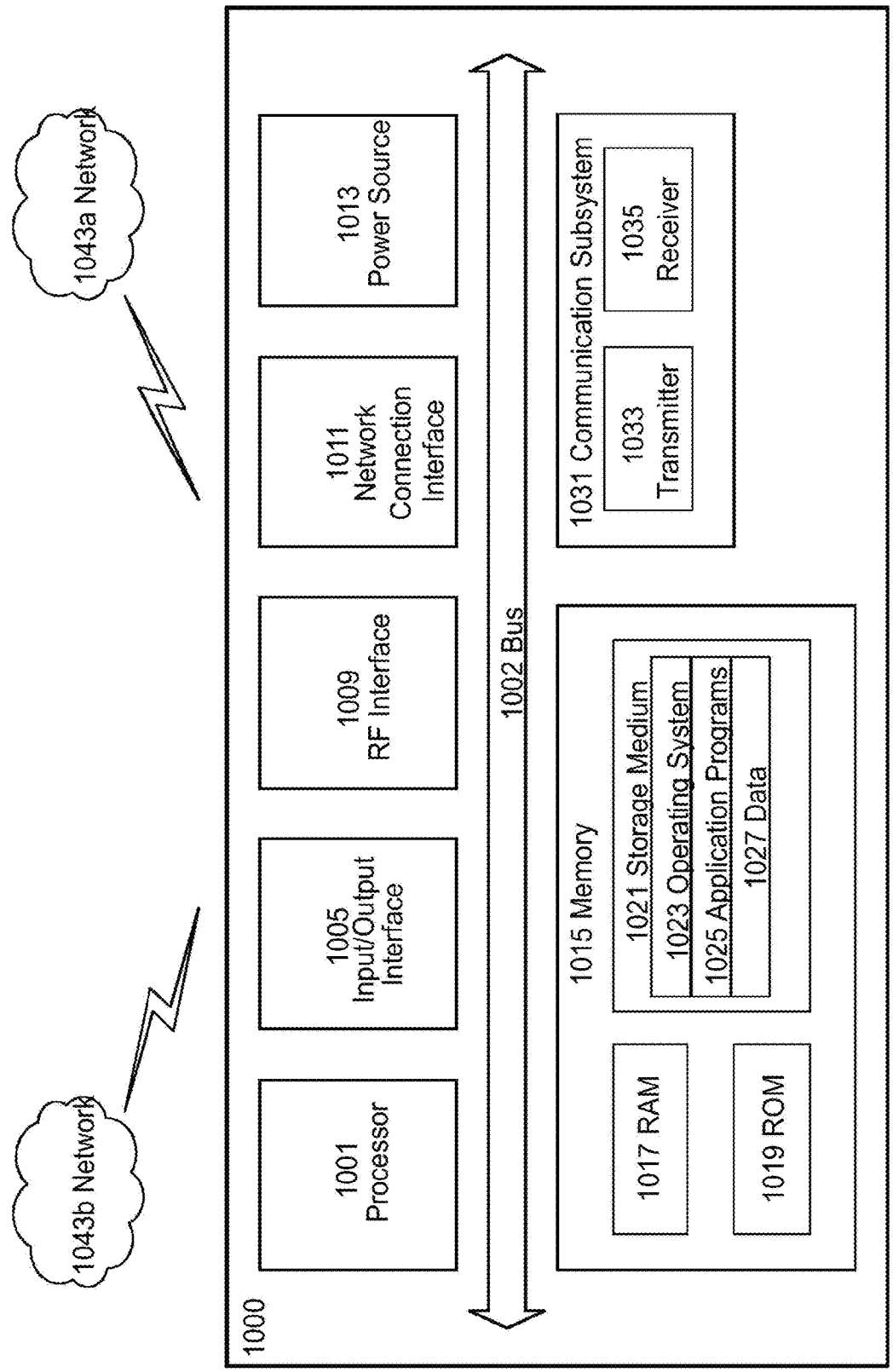
FIG. 10 illustrates an example user equipment, in accordance with certain embodiments.

FIG. 10 illustrates an example user equipment, in accordance with certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1000 may be any UE identified by the $3^{rd}$ Generation Partnership Project (3GPP), including a NB-IoT UE, a machine type communication (MTC) UE, and/or an enhanced MTC (eMTC) UE. UE 1000, as illustrated in FIG. 10, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 10 is a UE, the components discussed herein are equally applicable to a wireless device, and vice-versa.

In FIG. 10, UE 1000 includes processing circuitry 1001 that is operatively coupled to input/output interface 1005, radio frequency (RF) interface 1009, network connection interface 1011, memory 1015 including random access memory (RAM) 1017, read-only memory (ROM) 1019, and storage medium 1021 or the like, communication subsystem 1031, power source 1033, and/or any other component, or any combination thereof. Storage medium 1021 includes operating system 1023, application program 1025, and data 1027. In other embodiments, storage medium 1021 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1001 may be configured to process computer instructions and data. Processing circuitry 1001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1001 may include two central processing units (CPUs). Data may be information in a form suitable for use by a computer.

In the depicted embodiment, input/output interface 1005 may be configured to provide a communication interface to an input device, output device, or input and output device.

UE 1000 may be configured to use an output device via input/output interface 1005. An output device may use the same type of interface port as an input device. For example, a USB port may be used to provide input to and output from UE 1000. The output device may be a speaker, a sound card, a video card, a display, a monitor, a printer, an actuator, an emitter, a smartcard, another output device, or any combination thereof. UE 1000 may be configured to use an input device via input/output interface 1005 to allow a user to capture information into UE 1000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1009 may be configured to provide a communication interface to RF components such as a transmitter, a receiver, and an antenna. Network connection interface 1011 may be configured to provide a communication interface to network 1043*a*. Network 1043*a* may encompass wired and/or wireless networks such as a local-area network (LAN), a wide-area network (WAN), a computer network, a wireless network, a telecommunications network, another like network or any combination thereof. For example, network 1043*a* may comprise a Wi-Fi network. Network connection interface 1011 may be configured to include a receiver and a transmitter interface used to communicate with one or more other devices over a communication network according to one or more communication protocols, such as Ethernet, TCP/IP, SONET, ATM, or the like. Network connection interface 1011 may implement receiver and transmitter functionality appropriate to the communication network links (e.g., optical, electrical, and the like). The transmitter and receiver functions may share circuit components, software or firmware, or alternatively may be implemented separately.

RAM 1017 may be configured to interface via bus 1002 to processing circuitry 1001 to provide storage or caching of data or computer instructions during the execution of software programs such as the operating system, application programs, and device drivers. ROM 1019 may be configured to provide computer instructions or data to processing circuitry 1001. For example, ROM 1019 may be configured to store invariant low-level system code or data for basic system functions such as basic input and output (I/O), startup, or reception of keystrokes from a keyboard that are stored in a non-volatile memory. Storage medium 1021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1021 may be configured to include operating system 1023, application program 1025 such as a web browser application, a widget or gadget engine or another application, and data file 1027. Storage medium 1021 may store, for use by UE 1000, any of a variety of various operating systems or combinations of operating systems.

Storage medium 1021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 may allow UE 1000 to access computer-executable instructions, application programs or the like, stored on transitory or non-transitory memory media, to off-load data, or to upload data. An article of manufacture, such as one utilizing a communication system may be tangibly embodied in storage medium 1021, which may comprise a device readable medium.

In FIG. 10, processing circuitry 1001 may be configured to communicate with network 1043*b* using communication subsystem 1031. Network 1043*a* and network 1043*b* may be the same network or networks or different network or networks. Communication subsystem 1031 may be configured to include one or more transceivers used to communicate with network 1043*b*. For example, communication subsystem 1031 may be configured to include one or more transceivers used to communicate with one or more remote transceivers of another device capable of wireless communication such as another wireless device, UE, or base station of a radio access network (RAN) according to one or more communication protocols, such as IEEE 802.11, CDMA, WCDMA, GSM, LTE, UTRAN, WiMax, or the like. Each transceiver may include transmitter 1033 and/or receiver 1035 to implement transmitter or receiver functionality, respectively, appropriate to the RAN links (e.g., frequency allocations and the like). Further, transmitter 1033 and receiver 1035 of each transceiver may share circuit components, software or firmware, or alternatively may be implemented separately.

In the illustrated embodiment, the communication functions of communication subsystem 1031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 may include cellular communication, Wi-Fi communication, Bluetooth communication, and GPS communication. Network 1043*b* may encompass wired and/or wireless networks such as a local-area network (LAN), a wide-area network (WAN), a computer network, a wireless network, a telecommunications network, another like network or any combination thereof. For example, network 1043*b* may be a cellular network, a Wi-Fi network, and/or a near-field network. Power source 1013 may be configured to provide alternating current (AC) or direct current (DC) power to components of UE 1000.

The features, benefits and/or functions described herein may be implemented in one of the components of UE 1000 or partitioned across multiple components of UE 1000. Further, the features, benefits, and/or functions described herein may be implemented in any combination of hardware, software or firmware. In one example, communication subsystem 1031 may be configured to include any of the components described herein. Further, processing circuitry 1001 may be configured to communicate with any of such components over bus 1002. In another example, any of such components may be represented by program instructions stored in memory that when executed by processing circuitry 1001 perform the corresponding functions described herein. In another example, the functionality of any of such components may be partitioned between processing circuitry 1001 and communication subsystem 1031. In another example, the non-computationally intensive functions of any of such components may be implemented in software or firmware and the computationally intensive functions may be implemented in hardware.

Figure 11:
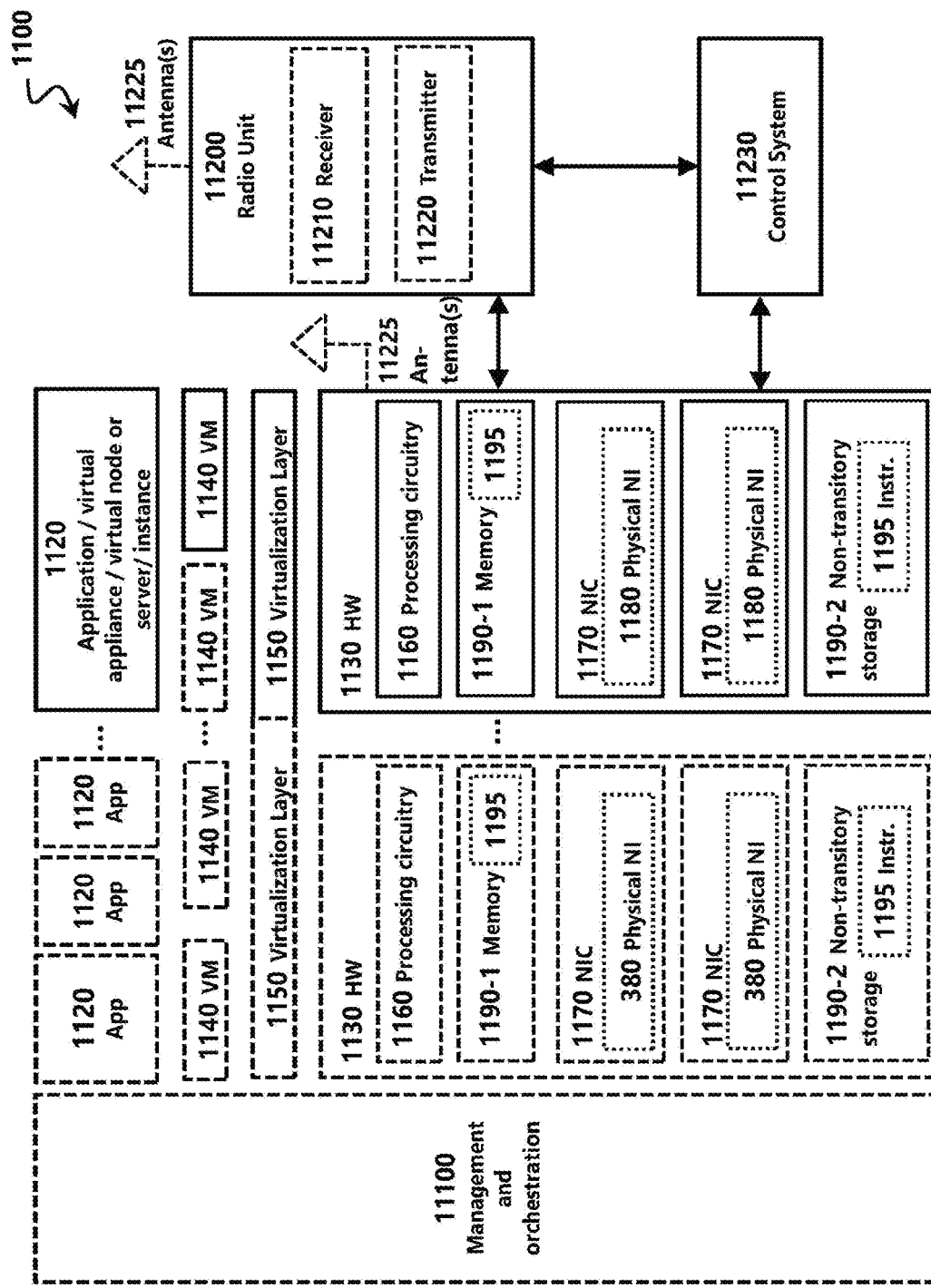
FIG. 11 illustrates an example virtualization environment, in accordance with certain embodiments.

FIG. 11 illustrates an example virtualization environment in accordance with some embodiments. More particularly, FIG. 11 is a schematic block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node may be entirely virtualized.

The functions may be implemented by one or more applications 1120 (which may alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100, comprises general-purpose or special-purpose network hardware devices 1130 comprising a set of one or more processors or processing circuitry 1160, which may be commercial off-the-shelf (COTS) processors, dedicated Application Specific Integrated Circuits (ASICs), or any other type of processing circuitry including digital or analog hardware components or special purpose processors. Each hardware device may comprise memory 1190-1 which may be non-persistent memory for temporarily storing instructions 1195 or software executed by processing circuitry 1160. Each hardware device may comprise one or more network interface controllers (NICs) 1170, also known as network interface cards, which include physical network interface 1180. Each hardware device may also include non-transitory, persistent, machine-readable storage media 1190-2 having stored therein software 1195 and/or instructions executable by processing circuitry 1160. Software 1195 may include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and may be run by a corresponding virtualization layer 1150 or hypervisor. Different embodiments of the instance of virtual appliance 1120 may be implemented on one or more of virtual machines 1140, and the implementations may be made in different ways.

During operation, processing circuitry 1160 executes software 1195 to instantiate the hypervisor or virtualization layer 1150, which may sometimes be referred to as a virtual machine monitor (VMM). Virtualization layer 1150 may present a virtual operating platform that appears like networking hardware to virtual machine 1140.

As shown in FIG. 11, hardware 1130 may be a standalone network node with generic or specific components. Hardware 1130 may comprise antenna 11225 and may implement some functions via virtualization. Alternatively, hardware 1130 may be part of a larger cluster of hardware (e.g. such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1140 may be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 11.

In some embodiments, one or more radio units 11200 that each include one or more transmitters 11220 and one or more receivers 11210 may be coupled to one or more antennas 11225. Radio units 11200 may communicate directly with hardware nodes 1130 via one or more appropriate network interfaces and may be used in combination with the virtual components to provide a virtual node with radio capabilities, such as a radio access node or a base station.

In some embodiments, some signalling can be effected with the use of control system 11230 which may alternatively be used for communication between the hardware nodes 1130 and radio units 11200.

Figure 12:
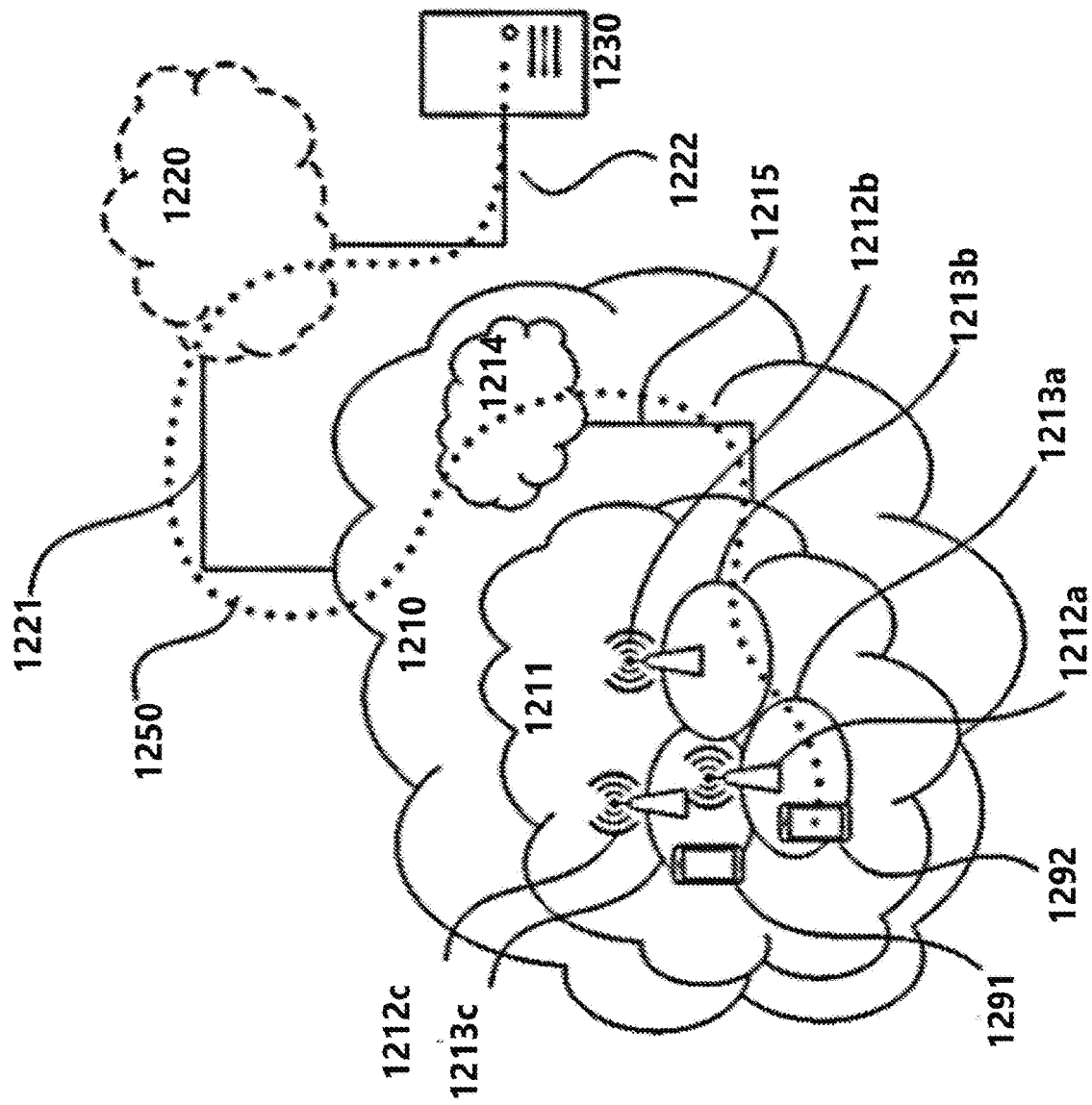
FIG. 12 illustrates an example telecommunication network connected via an intermediate network to a host computer, in accordance with certain embodiments.

FIG. 12 illustrates an example telecommunication network connected via an intermediate network to a host computer in accordance with certain embodiments. With reference to FIG. 12, in accordance with an embodiment, a communication system includes telecommunication network 1210, such as a 3GPP-type cellular network, which comprises access network 1211, such as a radio access network, and core network 1214. Access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to core network 1214 over a wired or wireless connection 1215. A first UE 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Figure 13:
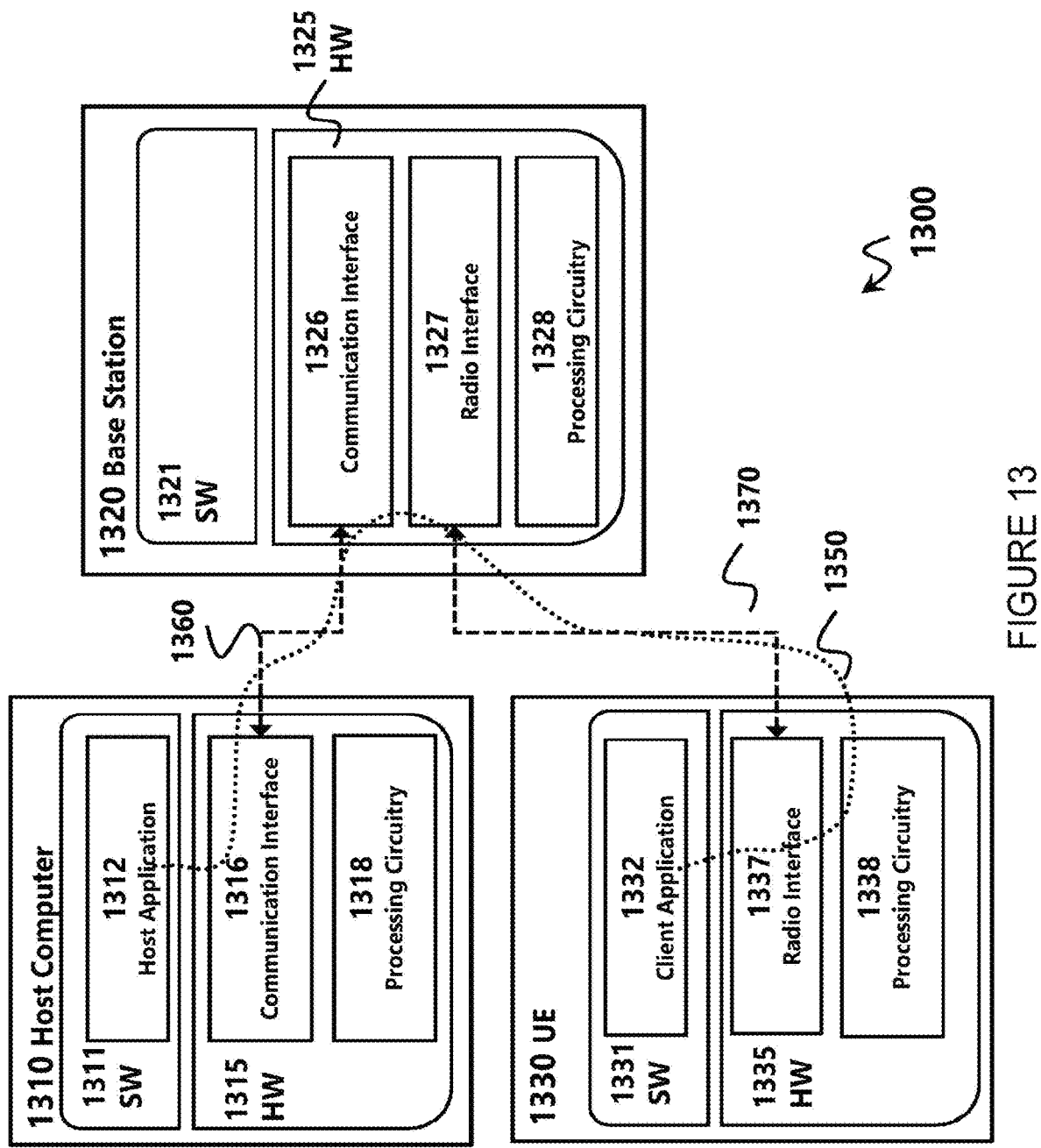
FIG. 13 illustrates an example host computer communicating via a base station with a user equipment over a partially wireless connection, in accordance with certain embodiments.

FIG. 13 illustrates an example host computer communicating via a base station with a user equipment over a partially wireless connection, in accordance with certain embodiments.

Example implementations, in accordance with an embodiment, of the UE, base station and host computer discussed in the preceding paragraphs will now be described with reference to FIG. 13. In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

It is noted that host computer 1310, base station 1320 and UE 1330 illustrated in FIG. 13 may be similar or identical to host computer 1230, one of base stations 1212a, 1212b, 1212c and one of UEs 1291, 1292 of FIG. 12, respectively. This is to say, the inner workings of these entities may be as shown in FIG. 13 and independently, the surrounding network topology may be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may improve the signaling overhead.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figure 14:
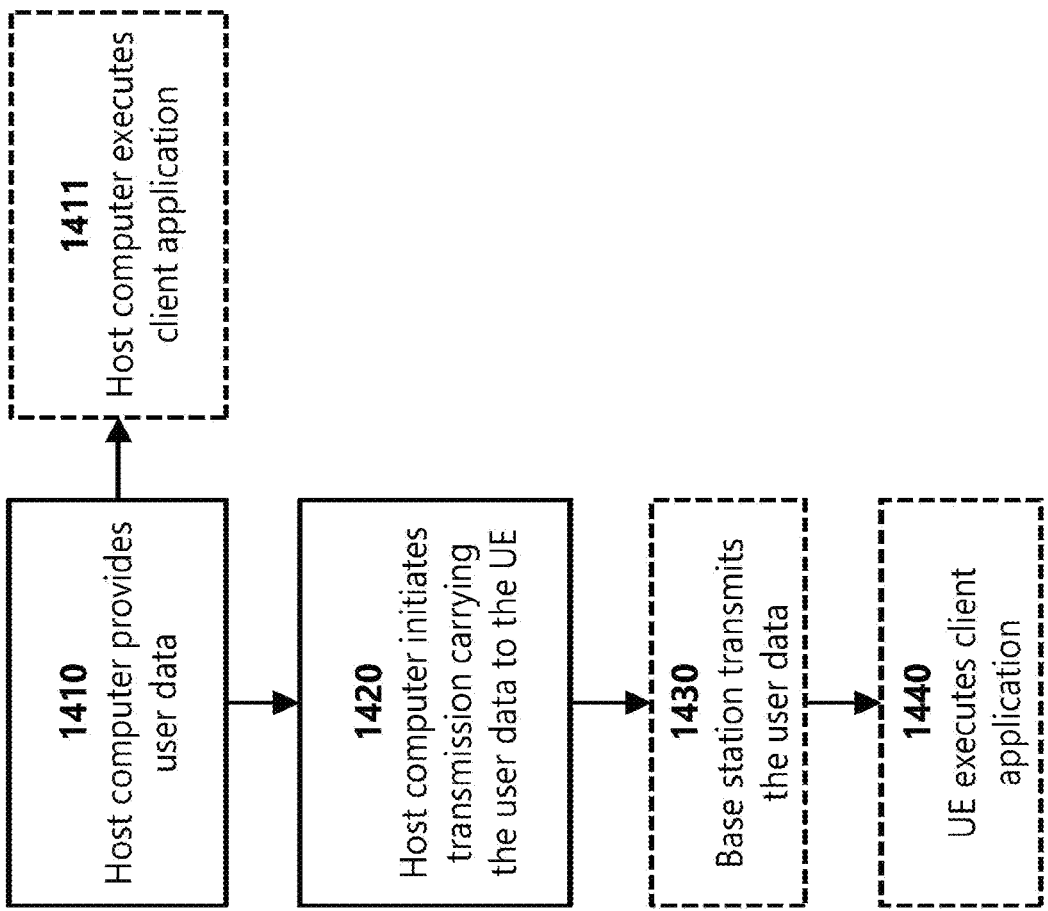
FIG. 14 is a flowchart illustrating an example method implemented in a communication system, in accordance certain embodiments.

FIG. 14 is a flowchart illustrating an example method implemented in a communication system, in accordance certain embodiments. More particularly, FIG. 14 illustrates an example method implemented in a communication system including a host computer, a base station and a user equipment. The communication system includes a host computer, a base station and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

Figure 15:
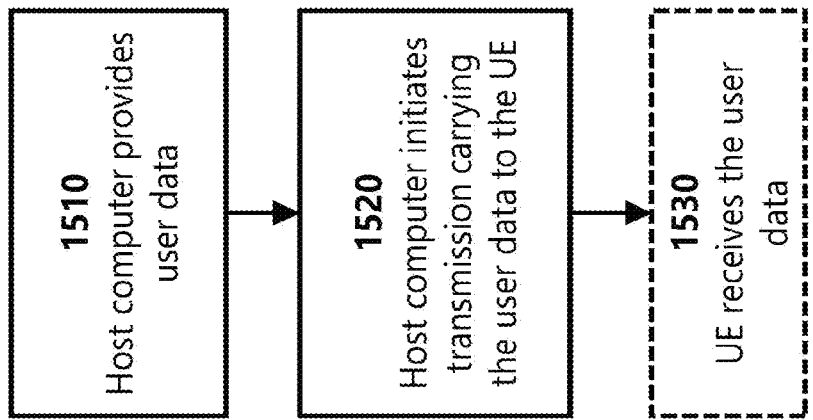
FIG. 15 is a flowchart illustrating a second example method implemented in a communication system, in accordance with certain embodiments.

FIG. 15 is a flowchart illustrating a second example method implemented in a communication system, in accordance with certain embodiments. More particularly, FIG. 15 illustrates an example method implemented in a communication system including a host computer, a base station and a user equipment. The communication system includes a host computer, a base station and a UE which may be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figure 16:
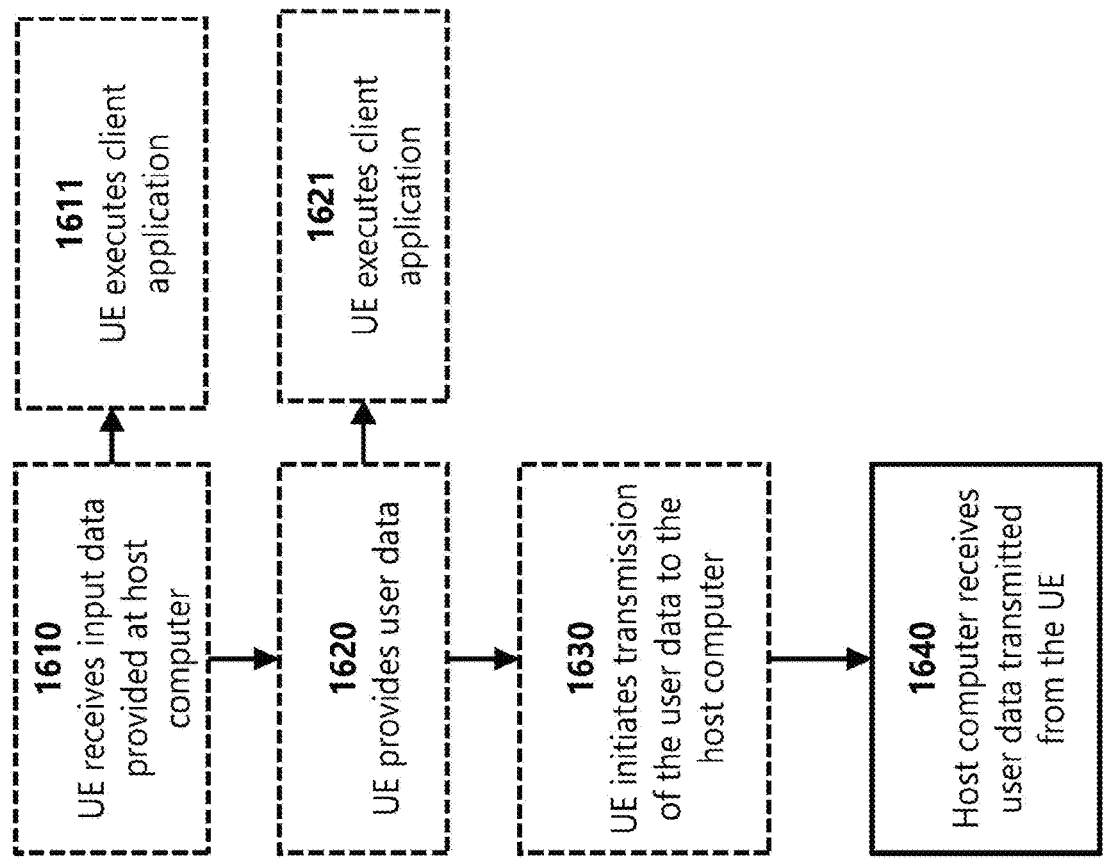
FIG. 16 is a flowchart illustrating a third method implemented in a communication system, in accordance with certain embodiments.

FIG. 16 is a flowchart illustrating a third method implemented in a communication system, in accordance with certain embodiments. More particularly, FIG. 16 illustrates an example method implemented in a communication system including a host computer, a base station and a user equipment. The communication system includes a host computer, a base station and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

Figure 17:
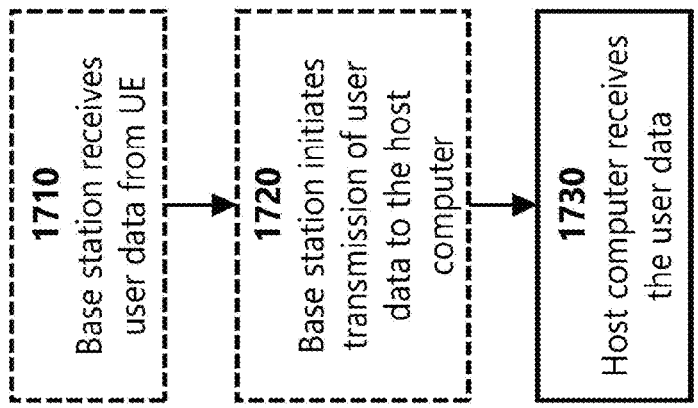
FIG. 17 is a flowchart illustrating a fourth method implemented in a communication system, in accordance with certain embodiments.

FIG. 17 is a flowchart illustrating a fourth method implemented in a communication system, in accordance with certain embodiments. More particularly, FIG. 17 illustrates an example method implemented in a communication system including a host computer, a base station and a user equipment. The communication system includes a host computer, a base station and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Certain example embodiments contemplated by the present disclosure are described below. Note that the enumerated embodiments below are for purposes of example only, and the present disclosure is not limited to the example embodiments enumerated below.

Group A Embodiments

1. A method performed by a wireless device for transmitting a channel state information (CSI) report indicating a plurality of precoder vectors, wherein each precoder vector corresponds to a frequency sub-band and comprises linear combinations of spatial-domain components and frequency-domain components, and wherein the plurality of precoder vectors is indicated by a set of coefficients of the linear combinations and the frequency-domain components, the method comprising:
estimating a channel, and based on the estimated channel:
   i. obtaining a first set of candidate frequency-domain components;
   ii. determining a set of spatial-domain components;
   iii. determining a second set of candidate frequency-domain components as a subset of the first set of candidate frequency-domain components;
   iv. determining, for each spatial-domain component of the set, a spatial-domain component-specific subset of frequency-domain components from the second set of candidate frequency-domain components, wherein each component in the spatial-domain component-specific subset of frequency-domain components is associated with one or more linear combining coefficients; and
   v. transmitting, to a network node, a CSI report comprising an indication of the determined second set of candidate frequency-domain components and an indication of the determined spatial-domain component-specific subsets of frequency-domain components.

2. The method of embodiment 1, wherein the CSI report further comprises the set of coefficients of the linear combinations.

3. The method of any of embodiments 1-2, wherein the CSI report further comprises one or more second sets of linear combining coefficients, each second set of one or more linear combining coefficients associated with a spatial-domain component.

4. The method of any of embodiments 1-3, wherein determining the second set of candidate frequency-domain components as a subset of the first set of candidate frequency-domain components comprises:
analyzing the estimated channel to determine one or more properties of the channel; and
selecting the second set of candidate frequency-domain components based on the determined one or more properties of the channel.

5. The method of any of embodiments 1-4, wherein the candidate frequency-components are orthogonal basis vectors.

6. The method of embodiment 5, wherein the orthogonal basis vectors are discrete Fourier transform vectors.

7. The method of any of embodiments 1-6, wherein a size of the frequency sub-band is one physical resource block (PRB).

8. The method of any of embodiments 1-6, wherein a size of the frequency sub-band is an integer number of physical resource blocks (PRBs).

9. The method of any of embodiments 1-8, wherein determining a spatial-domain component-specific subset of frequency-domain components comprises determining if the associated one or more linear combining coefficients are non-zero.

10. The method of embodiment 9, wherein transmitting an indication of the determined spatial-domain component-specific subsets of frequency-domain components comprises transmitting an indication of non-zero linear combining coefficients.

11. The method of any of embodiments 1-10, wherein obtaining the first set of candidate frequency-domain components comprises defining a first basis constituting a number of basis vectors.

12. The method of any of embodiments 1-11, wherein obtaining the first set of candidate frequency-domain components comprises one of:
accessing a predefined table;
obtaining the first set of candidate frequency-domain components via higher layer signaling; and
determining the first set of candidate frequency-domain components.

13. The method of any of embodiments 1-12, wherein the first set of candidate frequency-domain components corresponds to an oversampled discrete Fourier transform basis.

14. The method of any of embodiments 1-12, wherein the first set of candidate frequency-domain components corresponds to an orthogonal discrete Fourier transform basis.

15. The method of any of embodiments 1-14, wherein determining the second set of candidate frequency-domain components as a subset of the first set of candidate frequency-domain components comprises:
selecting a subset of the first set of candidate frequency-domain components to form a second set of candidate frequency components.

16. The method of any of embodiments 1-14, wherein determining the second set of candidate frequency-domain components as a subset of the first set of candidate frequency-domain components comprises:
creating a common basis for all spatial-domain components.

17. The method of embodiment 16, wherein the first set of candidate frequency-domain components is a first basis matrix B comprising K basis vectors.

18. The method of embodiment 17, further comprising:
selecting $K_c < K$ columns of the first basis matrix B.

19. The method of embodiment 17, further comprising:
concatenating the selected columns $K_c$ to form a common basis matrix $B_c$.

20. The method of embodiment 19, wherein the common basis matrix $B_c$ represents a channel and is used for both polarizations and all layers in the precoder.

21. The method of embodiment 19, wherein the common basis matrix $B_c$ is chosen per one or more of polarization and layer.

22. The method of any of embodiments 1-21, comprising selecting a spatial-domain component-specific basis from the second set of candidate frequency-domain components.

23. The method of embodiment 22, wherein selecting a spatial-domain component-specific basis from the second set of candidate frequency-domain components comprises:
selecting a selection of columns from a common basis $B_C$.

24. The method of any of the previous embodiments, further comprising:
   providing user data; and
   forwarding the user data to a host computer via the transmission to the base station.

Group B Embodiments

25. A method performed by a network node for receiving a channel state information (CSI) report indicating a plurality of precoder vectors, wherein each precoder vector corresponds to a frequency sub-band and comprises linear combinations of spatial-domain components and frequency-domain components, and wherein the plurality of precoder vectors is indicated by a set of coefficients of the linear combinations and the frequency-domain components, the method comprising
   receiving, from a wireless device, a channel state information (CSI) report comprising an indication of a determined second set of candidate-frequency domain components and an indication of one or more determined spatial-domain component-specific subsets of frequency-domain components; and
   determining one or more precoder vectors based upon the received indication of the determined second set of candidate-frequency domain components and the indication of one or more determined spatial-domain component-specific subsets of frequency-domain components.
26. The method of embodiment 25, further comprising:
   using one of the determined one or more precoder vectors to perform a transmission to the wireless device.
27. The method of embodiment 25, further comprising:
   using a different precoder vector from the one or more determined precoder vectors to perform a transmission to the wireless device.
28. The method of any of embodiments 25-27, wherein determining one or more precoder vectors based upon the received indication of the determined second set of candidate-frequency domain components and the indication of one or more determined spatial-domain component-specific subsets of frequency-domain components comprises:
   determining, from the spatial-domain component-specific subset of frequency-domain components, one or more spatial-domain components, wherein each component in the spatial-domain component-specific subset of frequency-domain components is associated with one or more linear combining coefficients;
   determining a first set of candidate frequency-domain components, the first set of candidate frequency-domain components comprising the second set of candidate frequency-domain components; and
   determining a set of spatial-domain components.
29. The method of any of embodiments 25-28, wherein the candidate frequency-components are orthogonal basis vectors.
30. The method of embodiment 29, wherein the orthogonal basis vectors are discrete Fourier transform vectors;
31. The method of any of embodiments 25-30, wherein a size of the frequency sub-band is one physical resource block (PRB).
32. The method of any of embodiments 25-30, wherein a size of the frequency sub-band is an integer number of physical resource blocks (PRBs).

33. The method of any of the previous embodiments, further comprising:
   obtaining user data; and
   forwarding the user data to a host computer or a wireless device.

Group C Embodiments

34. A wireless device, the wireless device comprising:
   processing circuitry configured to perform any of the steps of any of the Group A embodiments; and
   power supply circuitry configured to supply power to the wireless device.
35. A network node, the network node comprising:
   processing circuitry configured to perform any of the steps of any of the Group B embodiments;
   power supply circuitry configured to supply power to the network node.
36. A user equipment (UE), the UE comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A embodiments;
   an input interface connected to the processing circuitry and configured to allow input of information into the UE to be processed by the processing circuitry;
   an output interface connected to the processing circuitry and configured to output information from the UE that has been processed by the processing circuitry; and
   a battery connected to the processing circuitry and configured to supply power to the UE.
37. A computer program, the computer program comprising instructions which when executed on a computer perform any of the steps of any of the Group A embodiments.
38. A computer program product comprising a computer program, the computer program comprising instructions which when executed on a computer perform any of the steps of any of the Group A embodiments.
39. A non-transitory computer-readable storage medium or carrier comprising a computer program, the computer program comprising instructions which when executed on a computer perform any of the steps of any of the Group A embodiments.
40. A computer program, the computer program comprising instructions which when executed on a computer perform any of the steps of any of the Group B embodiments.
41. A computer program product comprising a computer program, the computer program comprising instructions which when executed on a computer perform any of the steps of any of the Group B embodiments.
42. A non-transitory computer-readable storage medium or carrier comprising a computer program, the computer program comprising instructions which when executed on a computer perform any of the steps of any of the Group B embodiments.
43. A communication system including a host computer comprising:
   processing circuitry configured to provide user data; and
   a communication interface configured to forward the user data to a cellular network for transmission to a user equipment (UE),
   wherein the cellular network comprises a network node having a radio interface and processing circuitry, the network node's processing circuitry configured to perform any of the steps of any of the Group B embodiments.

44. The communication system of the pervious embodiment further including the network node.

45. The communication system of the previous 2 embodiments, further including the UE, wherein the UE is configured to communicate with the network node.

46. The communication system of the previous 3 embodiments, wherein:
the processing circuitry of the host computer is configured to execute a host application, thereby providing the user data; and
the UE comprises processing circuitry configured to execute a client application associated with the host application.

47. A method implemented in a communication system including a host computer, a network node and a user equipment (UE), the method comprising:
at the host computer, providing user data; and
at the host computer, initiating a transmission carrying the user data to the UE via a cellular network comprising the network node, wherein the network node performs any of the steps of any of the Group B embodiments.

48. The method of the previous embodiment, further comprising, at the network node, transmitting the user data.

49. The method of the previous 2 embodiments, wherein the user data is provided at the host computer by executing a host application, the method further comprising, at the UE, executing a client application associated with the host application.

50. A user equipment (UE) configured to communicate with a network node, the UE comprising a radio interface and processing circuitry configured to performs the of the previous 3 embodiments.

51. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

52. The communication system of the previous embodiment, wherein the cellular network further includes a network node configured to communicate with the UE.

53. The communication system of the previous 2 embodiments, wherein:
the processing circuitry of the host computer is configured to execute a host application, thereby providing the user data; and
the UE's processing circuitry is configured to execute a client application associated with the host application.

54. A method implemented in a communication system including a host computer, a network node and a user equipment (UE), the method comprising:
at the host computer, providing user data; and
at the host computer, initiating a transmission carrying the user data to the UE via a cellular network comprising the network node, wherein the UE performs any of the steps of any of the Group A embodiments.

55. The method of the previous embodiment, further comprising at the UE, receiving the user data from the network node.

56. A communication system including a host computer comprising:
communication interface configured to receive user data originating from a transmission from a user equipment (UE) to a network node,
wherein the UE comprises a radio interface and processing circuitry, the UE's processing circuitry configured to perform any of the steps of any of the Group A embodiments.

57. The communication system of the previous embodiment, further including the UE.

58. The communication system of the previous 2 embodiments, further including the network node, wherein the network node comprises a radio interface configured to communicate with the UE and a communication interface configured to forward to the host computer the user data carried by a transmission from the UE to the network node.

59. The communication system of the previous 3 embodiments, wherein:
the processing circuitry of the host computer is configured to execute a host application; and
the UE's processing circuitry is configured to execute a client application associated with the host application, thereby providing the user data.

60. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

61. A method implemented in a communication system including a host computer, a network node and a user equipment (UE), the method comprising:
at the host computer, receiving user data transmitted to the network node from the UE, wherein the UE performs any of the steps of any of the Group A embodiments.

62. The method of the previous embodiment, further comprising, at the UE, providing the user data to the network node.

63. The method of the previous 2 embodiments, further comprising:
at the UE, executing a client application, thereby providing the user data to be transmitted; and
at the host computer, executing a host application associated with the client application.

64. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

65. A communication system including a host computer comprising a communication interface configured to receive user data originating from a transmission from a user equipment (UE) to a network node, wherein the network node comprises a radio interface and processing circuitry, the network node's processing circuitry configured to perform any of the steps of any of the Group B embodiments.

66. The communication system of the previous embodiment further including the network node.

67. The communication system of the previous 2 embodiments, further including the UE, wherein the UE is configured to communicate with the network node.

68. The communication system of the previous 3 embodiments, wherein:
the processing circuitry of the host computer is configured to execute a host application;
the UE is configured to execute a client application associated with the host application, thereby providing the user data to be received by the host computer.
69. A method implemented in a communication system including a host computer, a network node and a user equipment (UE), the method comprising:
at the host computer, receiving, from the network node, user data originating from a transmission which the network node has received from the UE, wherein the UE performs any of the steps of any of the Group A embodiments.
70. The method of the previous embodiment, further comprising at the network node, receiving the user data from the UE.
71. The method of the previous 2 embodiments, further comprising at the network node, initiating a transmission of the received user data to the host computer.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
BWP Bandwidth Part
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
CQIs Channel Quality Indicators
C-RNTI Cell RNTI
CRI CSI-RS Resource Indicator
CSI Channel State Information
CSI-RS Channel State Information Reference Signal
DCCH Dedicated Control Channel
DFT Discrete Fourier Transform
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
IMR Interference Measurement Resource
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MCS Modulation and Coding Scheme
MDT Minimization of Drive Tests
MIB Master Information Block
MIMO Multiple-Input Multiple Output
MME Mobility Management Entity
MSC Mobile Switching Center
MU-MIMO Multi-User MIMO
NPDCCH Narrowband Physical Downlink Control Channel
NR New Radio
NZP Non-Zero Power
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRB Physical Resource Block
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RE Resource Element
RI Rank Indicator
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TFRE Time Frequency Resource Element
TOA Time of Arrival
TSS Tertiary Synchronization Signal
TTI Transmission Time Interval
UE User Equipment
UL Uplink
ULA Uniform Linear Array
UMTS Universal Mobile Telecommunication System
UPA Uniform Planar Array
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A host configured to operate in a communication system to provide an over-the-top, OTT, service, the host comprising:
processing circuitry configured to provide user data; and
a network interface configured to initiate transmission of the user data to a network node in a cellular network for transmission to a user equipment (UE),
the network node having a communication interface and processing circuitry configured to perform a method for receiving a channel state information (CSI) report, the CSI report indicating a linear combination of spatial-domain components and frequency-domain components, the method comprising:
receiving the CSI report from the UE, the CSI report comprising an indication of:
a second set of candidate frequency-domain components selected from a first set of candidate frequency-domain components, wherein the second set of candidate frequency-domain components is smaller than the first set of candidate frequency-domain components,
spatial-domain component-specific sets of one or more frequency-domain components which are selected from the second set of candidate frequency-domain components, wherein at least one of the spatial-domain component-specific sets of one or more frequency-domain components is smaller than the second set of candidate frequency-domain components, and
non-zero coefficients associated with the frequency-domain components in the spatial-domain component-specific sets of one or more frequency-domain components.

2. The host of claim 1, the method further comprising:
determining one or more precoders based upon the indication received in the CSI report.

3. The host of claim 1, wherein the linear combination of spatial-domain components and frequency-domain components corresponds to precoders for a plurality of frequency sub-bands.

4. A method implemented in a communication system including a host computer, one or more base stations and a user equipment (UE), comprising:
at the host computer, providing user data; and
at the host computer, initiating a transmission carrying the user data to the UE via a cellular network comprising the one or more base stations wherein at least one of the one or more base stations, having a communication interface and processing circuitry configured to perform a method for receiving a channel state information (CSI) report, the CSI report indicating a linear combination of spatial-domain components and frequency-domain components, is configured to:
receive the CSI report from the UE, the CSI report comprising an indication of:
a second set of candidate frequency-domain components selected from a first set of candidate frequency-domain components, wherein the second set of candidate frequency-domain components is smaller than the first set of candidate frequency-domain components,
spatial-domain component-specific sets of one or more frequency-domain components which are selected from the second set of candidate frequency-domain components, wherein at least one of the spatial-domain component-specific sets of one or more frequency-domain components is smaller than the second set of candidate frequency-domain components, and
non-zero coefficients associated with the frequency-domain components in the spatial-domain component-specific sets of one or more frequency-domain components.

5. The method of claim 4, the at least one of the one or more base stations is further configured to:
determine one or more precoders based upon the indication received in the CSI report.

6. The method of claim 4, wherein the linear combination of spatial-domain components and frequency-domain components corresponds to precoders for a plurality of frequency sub-bands.

7. A communication system including a host computer comprising:
processing circuitry configured to provide user data; and
a communication interface configured to initiate transmission of the user data to
a communication network for transmission to a user equipment (UE), wherein the communication network comprises at least one base station having a communication interface and processing circuitry configured to perform a method for receiving a channel state information (CSI) report, the CSI report indicating a linear combination of spatial-domain components and frequency-domain components, the base station processing circuitry configured to:
receive the CSI report from the UE, the CSI report comprising an indication of:
a second set of candidate frequency-domain components selected from a first set of candidate frequency-domain components, wherein the second set of candidate frequency-domain components is smaller than the first set of candidate frequency-domain components,
spatial-domain component-specific sets of one or more frequency-domain components which are selected from the second set of candidate frequency-domain components, wherein at least one of the spatial-domain component-specific sets of one or more frequency-domain components is smaller than the second set of candidate frequency-domain components, and
non-zero coefficients associated with the frequency-domain components in the spatial-domain component-specific sets of one or more frequency-domain components.

8. The communication system of claim 7, the base station processing circuitry further configured to:
determine one or more precoders based upon the indication received in the CSI report.

9. The communication system of claim 7, wherein the linear combination of spatial-domain components and frequency-domain components corresponds to precoders for a plurality of frequency sub-bands.

10. A host configured to operate in a communication system to provide an over-the-top, OTT, service, the host comprising:
processing circuitry configured to provide user data; and
a network interface configured to initiate transmission of the user data to a network node in a cellular network for transmission to a user equipment (UE),
the network node having a communication interface and processing circuitry configured to perform a method for receiving a channel state information (CSI) report, wherein the CSI report indicates a plurality of precoder vectors, wherein the precoder vectors are linear combinations of spatial-domain components, wherein the coefficients for the spatial-domain components in the linear combinations of spatial-domain components are parameterized in the frequency-domain as linear combinations of a set of frequency-domain components and a set of coefficients for the frequency-domain components in the linear combinations of the set of frequency-domain components, the method comprising:
receiving the CSI report from the UE, the CSI report comprising an indication of:
a second set of candidate frequency-domain components selected from a first set of candidate frequency-domain components, wherein the second set of candidate frequency-domain components is smaller than the first set of candidate frequency-domain components,
spatial-domain component-specific sets of one or more frequency-domain components which are selected from the second set of candidate frequency-domain components, wherein at least one of the spatial-domain component-specific sets of one or more frequency-domain components is smaller than the second set of candidate frequency domain components, and
non-zero coefficients associated with the frequency-domain components in the spatial-domain component-specific sets of one or more frequency-domain components.

11. The host computer of claim 10, the method further comprising:
determining one or more precoders based upon the indication received in the CSI report.

12. A communication system including a host computer comprising:
processing circuitry configured to provide user data; and
a communication interface configured to initiate transmission of the user data to a communication network for transmission to a user equipment (UE), wherein the communication network comprises at least one base station having a communication interface and processing circuitry configured to perform a method for receiving a channel state information (CSI) report, wherein the CSI report indicates a plurality of precoder vectors, wherein the precoder vectors are linear combinations of spatial-domain components, wherein the coefficients for the spatial-domain components in the linear combinations of spatial-domain components are parameterized in the frequency-domain as linear combinations of a set of frequency-domain components and a set of coefficients for the frequency-domain components in the linear combinations of the set of frequency-domain components, the base station processing circuitry configured to:
receive the CSI report from the UE, the CSI report comprising an indication of:
a second set of candidate frequency-domain components selected from a first set of candidate frequency-domain components, wherein the second set of candidate frequency-domain components is smaller than the first set of candidate frequency-domain components,
spatial-domain component-specific sets of one or more frequency-domain components which are selected from the second set of candidate frequency-domain components, wherein at least one of the spatial-domain component-specific sets of one or more frequency-domain components is smaller than the second set of candidate frequency domain components, and
non-zero coefficients associated with the frequency-domain components in the spatial-domain component-specific sets of one or more frequency-domain components.

13. The communication system of claim 12, the base station processing circuitry further configured to:
   determine one or more precoders based upon the indication received in the CSI report.

* * * * *

UNITED STATES PATENT AND TRADEMARK OFFICE
CERTIFICATE OF CORRECTION

PATENT NO.      : 12,149,308 B2
APPLICATION NO. : 18/665219
DATED           : November 19, 2024
INVENTOR(S)     : Wernersson et al.

Page 1 of 1

It is certified that error appears in the above-identified patent and that said Letters Patent is hereby corrected as shown below:

In the Specification

In Column 3, Line 1, delete "($N_p$=2)" and insert -- ($N_P$=2) --, therefor.

In Column 6, Line 17, delete "$\varphi_{1,i}^{(2)}$" and insert -- $p_{1,i}^{(2)}$ --, therefor.

In Column 7, Line 23, delete "$a_0, \ldots, a_{K-1}$." and insert -- $a_0, \ldots, a_{K-1}$. --, therefor.

In Column 7, Lines 31-32, delete

"$c_{l,i}(f) = f(k, I, a_0, \ldots, a_{K-1}) = [B]_{k,:} a = \sum_{d=0}^{K-1} b_{k,d} a_d$." and insert -- $c_{l,i}(k) = f(k, I, a_0, \ldots, a_{K-1}) = [B]_{k,:} a = \sum_{d=0}^{K-1} b_{k,d} a_d$. --, therefor.

In Column 27, Line 28, delete

"$B_i = [B_c(I_b(i,0)) \; B_c(I_b(i,1)) \; \ldots \; B_c(I_b(i, Kb(i)-1))]$," and insert -- $B_i = [B_c(I_b(i,0)) \; B_c(I_b(i,1)) \; \ldots \; B_c(I_b(i, Kb(i)-1))]$. --, therefor.

Signed and Sealed this
Nineteenth Day of August, 2025

Coke Morgan Stewart
*Acting Director of the United States Patent and Trademark Office*